(12) United States Patent
Lee et al.

(10) Patent No.: US 11,421,900 B2
(45) Date of Patent: Aug. 23, 2022

(54) AIR CONDITIONER AND CONTROL METHOD TO CHANGE AN OPERATING MODE BASED ON A DURATION OF TIME DETERMINED BASED ON AN OUTDOOR TEMPERATURE

(71) Applicant: SAMSUNG ELECTRONICS CO., LTD., Suwon-si (KR)

(72) Inventors: Suk Ho Lee, Suwon-si (KR); Chang Yong Lee, Suwon-si (KR); Jae Hun Hur, Suwon-si (KR); Min Chang, Suwon-si (KR); Dae Chui Han, Suwon-si (KR); Jong Won Bak, Suwon-si (KR); Hyeong Joon Seo, Suwon-si (KR); Dong Il Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 16/575,567

(22) Filed: Sep. 19, 2019

(65) Prior Publication Data
US 2020/0088430 A1 Mar. 19, 2020

(30) Foreign Application Priority Data
Sep. 19, 2018 (KR) .......................... 10-2018-0111882

(51) Int. Cl.
*F24F 11/30* (2018.01)
*F24F 11/56* (2018.01)
(Continued)

(52) U.S. Cl.
CPC .............. *F24F 11/30* (2018.01); *F24F 11/56* (2018.01); *F24F 11/61* (2018.01); *F24F 11/64* (2018.01);
(Continued)

(58) Field of Classification Search
CPC .............................. F24F 2221/54; F24F 11/67
See application file for complete search history.

(56) References Cited

U.S. PATENT DOCUMENTS 5,560,422 A * 10/1996 Matumoto ......... G05D 23/1917
165/259
2008/0179409 A1 * 7/2008 Seem ................. G05D 23/1917
236/49.3
(Continued)

FOREIGN PATENT DOCUMENTS

CN       1121574 A     5/1996
CN       1428567 A     7/2003
(Continued)

OTHER PUBLICATIONS

International Search Report dated Dec. 18, 2019 in International Patent Application No. PCT/KR2019/010404.
(Continued)

*Primary Examiner* — Nathan L Laughlin
(74) *Attorney, Agent, or Firm* — Staas & Halsey LLP

(57) ABSTRACT

Disclosed herein is an air conditioner and control method of determining duration to be maintained at a reference temperature of a mode change based on an outdoor temperature. The air conditioner includes a compressor, an outdoor heat exchanger, an indoor heat exchanger, a four-way valve configured to guide refrigerant compressed in the compressor to either the outdoor heat exchanger or the indoor heat exchanger according to a cooling mode or a heating mode, and a controller configured to determine duration corresponding to a measured outdoor temperature, change the heating mode to the cooling mode when the measured indoor temperature is maintained at a first reference indoor temperature or greater for the determined duration, and change the cooling mode to the heating mode when a
(Continued)

measured indoor temperature is maintained at a second reference indoor temperature or less for the determined duration.

20 Claims, 16 Drawing Sheets

(51) Int. Cl.
*F24F 11/61* (2018.01)
*F24F 11/64* (2018.01)
*F24F 11/67* (2018.01)
*G05B 19/042* (2006.01)
*F24F 110/10* (2018.01)
*F24F 110/12* (2018.01)
*F24F 120/20* (2018.01)

(52) U.S. Cl.
CPC ............ *F24F 11/67* (2018.01); *G05B 19/042* (2013.01); *F24F 2110/10* (2018.01); *F24F 2110/12* (2018.01); *F24F 2120/20* (2018.01); *F24F 2221/54* (2013.01); *G05B 2219/2614* (2013.01)

(56) References Cited

U.S. PATENT DOCUMENTS

| | | | | |
|---|---|---|---|---|
| 2012/0061068 A1* | 3/2012 | Anderson | ................ | F24F 11/30 |
| | | | | 165/254 |
| 2012/0285655 A1* | 11/2012 | Lee | ........................ | F25B 13/00 |
| | | | | 165/11.1 |
| 2014/0263678 A1 | 9/2014 | Schnell et al. | | |
| 2014/0308138 A1* | 10/2014 | Pham | ...................... | F04B 49/02 |
| | | | | 417/12 |
| 2019/0353370 A1* | 11/2019 | Hern | ........................ | F24F 11/32 |

FOREIGN PATENT DOCUMENTS

| | | | |
|---|---|---|---|
| CN | 104566807 A | 4/2015 | |
| CN | 105444327 A | 3/2016 | |
| CN | 106352510 A | 1/2017 | |
| CN | 106403183 A | 2/2017 | |
| EP | 0 678 712 A2 | 10/1995 | |
| JP | 5-79677 | 3/1993 | |
| JP | 2006-153396 | 6/2006 | |
| JP | 2011-214782 | 10/2011 | |
| JP | 2015-209996 A | 11/2015 | |
| KR | 10-0347808 | 12/2002 | |
| KR | 10-0714087 | 5/2007 | |
| KR | 10-2012-0126252 A | 11/2012 | |
| KR | 10-2010-008184 | 7/2015 | |
| KR | 10-2015-0091917 A | 8/2015 | |
| KR | 10-1683918 | 12/2016 | |

OTHER PUBLICATIONS

Extended European Search Report for European Application No. 19 86 1437.2 dated Jul. 19, 2021 (seven pages).

Chinese Office Action issued Chinese Application No. 201980062216.1 dated May 7, 2022.

* cited by examiner

FIG. 7

| SET NUMBER | FIRST DURATION |
|---|---|
| 1 | 30 MINUTES (REGARDLESS OF OUTDOOR TEMPERATURE) |
| 2 | ONE MINUTE AT OUTDOOR TEMPERATURE 30°C OR GREATER / 30 MINUTES AT OUTDOOR TEMPERATURE LESS THAN 30°C |
| 3 | ONE MINUTE AT OUTDOOR TEMPERATURE 27°C OR GREATER / 30 MINUTES AT OUTDOOR TEMPERATURE LESS THAN 27°C |
| 4 | ONE MINUTE AT OUTDOOR TEMPERATURE 24°C OR GREATER / 30 MINUTES AT OUTDOOR TEMPERATURE LESS THAN 24°C |

FIG. 8

| SET NUMBER | SECOND DURATION |
|---|---|
| 1 | 30 MINUTES (REGARDLESS OF OUTDOOR TEMPERATURE) |
| 2 | ONE MINUTE AT OUTDOOR TEMPERATURE 0°C OR LESS / 30 MINUTES AT OUTDOOR TEMPERATURE MORE THAN 0°C |
| 3 | ONE MINUTE AT OUTDOOR TEMPERATURE 5°C OR LESS / 30 MINUTES AT OUTDOOR TEMPERATURE MORE THAN 5°C |
| 4 | ONE MINUTE AT OUTDOOR TEMPERATURE 10°C OR LESS / 30 MINUTES AT OUTDOOR TEMPERATURE MORE THAN 10°C |

AIR CONDITIONER AND CONTROL METHOD TO CHANGE AN OPERATING MODE BASED ON A DURATION OF TIME DETERMINED BASED ON AN OUTDOOR TEMPERATURE

CROSS-REFERENCE TO RELATED APPLICATION(S)

This application is based on and claims priority under 35 U.S.C. § 119 to Korean Patent Application No. 10-2018-0111882, filed on Sep. 19, 2018, in the Korean Intellectual Property Office, the disclosure of which is incorporated by reference herein in its entirety

BACKGROUND

1. Field

The disclosure relates to an air conditioner capable of controlling indoor air and a control method of thereof.

2. Description of Related Art

An air conditioner is a device for controlling the indoor air appropriately for the purpose of use and a device for adjusting the temperature, humidity, air cleanliness or air flow of the indoor air. The air conditioner can be used in various places such as a general house, an office, a factory, and a vehicle.

The air conditioner discharges cooled air obtained through the refrigeration cycle, which is generally composed of a process of compressing, condensing, expanding and evaporating the refrigerant, to the indoor space, or discharges heated air obtained by revering the above-described process to the indoor space, thereby adjusting the indoor air.

The air conditioner may include multiple air conditioner system. The multi air conditioner system may be configured to adjust air in a plurality of indoor spaces by connecting a plurality of indoor units to at least one outdoor unit using a single pipe system.

SUMMARY

Therefore, it is an aspect of the disclosure to provide an air conditioner capable of determining duration that is required to be maintained at a reference temperature of a mode change for changing a mode, based on an outdoor temperature, and a control method thereof.

Additional aspects of the disclosure will be set forth in part in the description which follows and, in part, will be obvious from the description, or may be learned by practice of the disclosure.

In accordance with an aspect of the disclosure, an air conditioner includes a compressor configured to compress a refrigerant, an outdoor heat exchanger configured to perform heat exchange between outdoor air and the refrigerant, an indoor heat exchanger configured to perform heat exchange between indoor air and the refrigerant, a four-way valve configured to guide the refrigerant compressed in the compressor to either the outdoor heat exchanger or the indoor heat exchanger according to a cooling mode or a heating mode, an outdoor temperature measurer configured to measure an outdoor temperature, an indoor temperature measurer configured to measure an indoor temperature, and a controller configured to determine duration corresponding to the measured outdoor temperature, configured to change the heating mode to the cooling mode when the measured indoor temperature is maintained at a first reference indoor temperature or greater for the determined duration, and configured to change the cooling mode to the heating mode when the measured indoor temperature is maintained at a second reference indoor temperature or less for the determined duration.

The controller may determine the duration to be shorter than predetermined basic duration when the measured outdoor temperature is equal to or greater than a first reference outdoor temperature.

The controller may set a first outdoor lower limit temperature and a first outdoor upper limit temperature as a reference temperature to reduce duration for a change to the cooling mode, and the controller may determine the duration to allow a period of time, which is reduced from the predetermined basic duration, to increase as the measured outdoor temperature increases from the first outdoor lower limit temperature to the first outdoor upper limit temperature.

In a state in which the air conditioner performs a heating operation according to the heating mode, when the measured indoor temperature is maintained at the first reference indoor temperature or greater for the determined duration, the controller may change the mode of the air conditioner from the heating mode to the cooling mode after the determined duration.

The controller may determine the duration to be shorter than predetermined basic duration when the measured outdoor temperature is equal to or less than a second reference outdoor temperature.

The controller may set a second outdoor lower limit temperature and a second outdoor upper limit temperature as a reference temperature to reduce duration for a change to the heating mode, and the controller may determine the duration to allow a period of time, which is reduced from the predetermined basic duration, to increase as the measured outdoor temperature decreases from the second outdoor upper limit temperature to the second outdoor lower limit temperature.

In a state in which the air conditioner performs a cooling operation according to the cooling mode, when the measured indoor temperature is maintained at the second reference indoor temperature or less for the determined duration, the controller may change the mode of the air conditioner from the cooling mode to the heating mode after the determined duration.

The air conditioner may further include an inputter configured to receive an input from a user, and based on the user input, the controller may set a reference outdoor temperature to reduce the duration for a change to the cooling mode, and the controller may set a reference outdoor temperature to reduce the duration for a change to the heating mode.

The inputters may receive a set temperature of the indoor temperature, a first critical temperature and a second critical temperature from a user, and based on the user input, the controller may set the first reference indoor temperature to be greater than the set temperature by the first critical temperature, and set the second reference indoor temperature to be less than the set temperature by the second critical temperature.

The inputters may receive a set heating temperature of the indoor temperature, a set cooling temperature of the indoor temperature, a third critical temperature and a fourth critical temperature from a user, and based on the user input, the controller may set the first reference indoor temperature to be greater than the set heating temperature by the third critical temperature, and set the second reference indoor temperature to be less than the set cooling temperature by the fourth critical temperature.

In accordance with another aspect of the disclosure, a control method of an air conditioner including a compressor configured to compress a refrigerant, an outdoor heat exchanger configured to perform heat exchange between outdoor air and the refrigerant, an indoor heat exchanger configured to perform heat exchange between indoor air and the refrigerant, and a four-way valve configured to guide the compressed refrigerant to either the outdoor heat exchanger or the indoor heat exchanger according to a mode, the control method includes measuring an indoor temperature and an outdoor temperature, determining duration corresponding to the measured outdoor temperature, changing a heating mode to a cooling mode when the measured indoor temperature is maintained at a first reference indoor temperature or greater for the determined duration, and changing the cooling mode to the heating mode when the measured indoor temperature is maintained at a second reference indoor temperature or less for the determined duration.

Determining duration may include determining the duration to be shorter than predetermined basic duration when the measured outdoor temperature is equal to or greater than a first reference outdoor temperature that is set as a reference temperature to reduce the duration for a change to the cooling mode.

Determining duration may include setting a first outdoor lower limit temperature and a first outdoor upper limit temperature as a reference temperature to reduce duration for a change to the cooling mode, and determining the duration to allow a period of time, which is reduced from the predetermined basic duration, to increase as the measured outdoor temperature increases from the first outdoor lower limit temperature to the first outdoor upper limit temperature.

Changing a heating mode to a cooling mode may include in a state in which the air conditioner performs a heating operation according to the heating mode, when the measured indoor temperature is maintained at the first reference indoor temperature or greater for the determined duration, changing the mode of the air conditioner from the heating mode to the cooling mode after the determined duration.

Determining duration may include determining the duration to be shorter than predetermined basic duration when the measured outdoor temperature is equal to or less than a second reference outdoor temperature.

Determining duration may include setting a second outdoor lower limit temperature and a second outdoor upper limit temperature as a reference temperature to reduce duration for a change to the heating mode, and determining the duration to allow a period of time, which is reduced from the predetermined basic duration, to increase as the measured outdoor temperature decreases from the second outdoor upper limit temperature to the second outdoor lower limit temperature.

Changing the cooling mode to the heating mode may include in a state in which the air conditioner performs a cooling operation according to the cooling mode, when the measured indoor temperature is maintained at the second reference indoor temperature or less for the determined duration, changing the mode of the air conditioner from the cooling mode to the heating mode after the determined duration.

The control method may further include receiving an input from a user, based on the user input, setting a reference outdoor temperature to reduce the duration for a change to the cooling mode, and setting a reference outdoor temperature to reduce the duration for a change to the heating mode.

The control method may further include receiving a set temperature of the indoor temperature, a first critical temperature and a second critical temperature from a user, setting the first reference indoor temperature to be greater than the set temperature by the first critical temperature based on the user input, and setting the second reference indoor temperature to be less than the set temperature by the second critical temperature.

In accordance with another aspect of the disclosure, an air conditioner includes at least one outdoor unit configured to perform heat exchange between outdoor air and a refrigerant and configured to measure an outdoor temperature, a plurality of indoor units configured to perform heat exchange between indoor air and the refrigerant and configured to measure an indoor temperature of an indoor space in which the plurality of indoor unit is placed, a distributor configured to distribute the refrigerant supplied from the at least one outdoor unit to each of the plurality of indoor units according to a mode of each of the plurality of indoor units, and a controller configured to determine duration corresponding to the measured outdoor temperature, configured to change a mode of at least one indoor unit to a cooling mode when an indoor temperature, which is measured in at least one indoor unit among the plurality of indoor units, is maintained at a first reference indoor temperature or greater that is for a change to the cooling mode, for the determined duration, and configured to change a mode of at least one indoor unit to a heating mode when the measured indoor temperature is maintained at a second reference indoor temperature or less for a change to the heating mode, for the determined duration.

BRIEF DESCRIPTION OF THE DRAWINGS

These and/or other aspects of the disclosure will become apparent and more readily appreciated from the following description of embodiments, taken in conjunction with the accompanying drawings of which:

FIG. 7 is a view illustrating first duration information used for changing a heating mode to a cooling mode in the air conditioner according to an embodiment of the disclosure;

FIG. 8 is a view illustrating second duration information used for changing the cooling mode to the heating mode in the air conditioner according to an embodiment of the disclosure;

DETAILED DESCRIPTION

Figure 1:
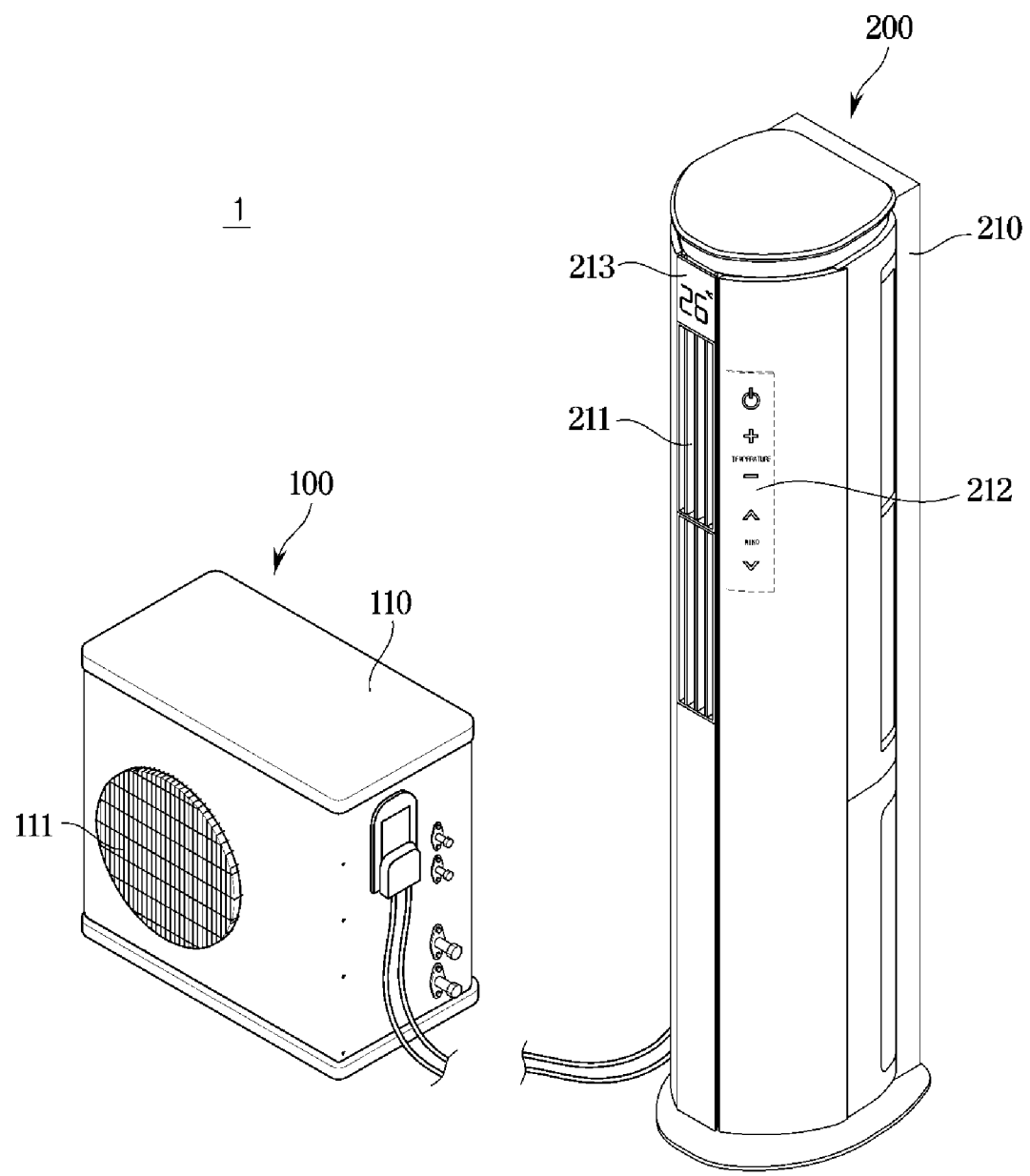
FIG. 1 is a view illustrating an appearance of an air conditioner according to an embodiment.

Embodiments described in the disclosure and configurations shown in the drawings are merely examples of the embodiments of the disclosure, and may be modified in various different ways at the time of filing of the present application to replace the embodiments and drawings of the disclosure.

It will be understood that when an element is referred to as being "connected" another element, it can be directly or indirectly connected to the other element, wherein the indirect connection includes "connection via a wireless communication network".

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

In the following description, terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings.

FIG. 1 is a view illustrating an appearance of an air conditioner 1 according to an embodiment of the disclosure.

Referring to FIG. 1, the air conditioner 1 includes an outdoor unit 100 located in the outdoor space and configured to perform heat exchange between a refrigerant and the outdoor air and an indoor unit 200 located in the indoor space and configured to perform heat exchange between a refrigerant and the indoor air.

The outdoor unit 100 includes an outdoor unit body 110 forming an outer appearance of the outdoor unit 100 and an outdoor unit discharge port 111 provided at one side of the outdoor unit body 110 to discharge heat exchanged air.

The indoor unit 200 includes an indoor unit body 210 forming an outer appearance of the indoor unit 200, an indoor unit discharge port 211 provided on the front surface of the indoor unit body 210 to discharge heat exchanged air, an operation panel 212 receiving an operation command for the air conditioner 1 from a user, and a display panel 213 displaying operation information of the air conditioner 1.

For ease of understanding, a signal flow of the air conditioner 1 and a refrigerant flow of the air conditioner 1 will be individually described and thus the refrigerant flow of the air conditioner 1 will be described first, and the signal flow of the air conditioner 1 will be described later.

Figure 2:
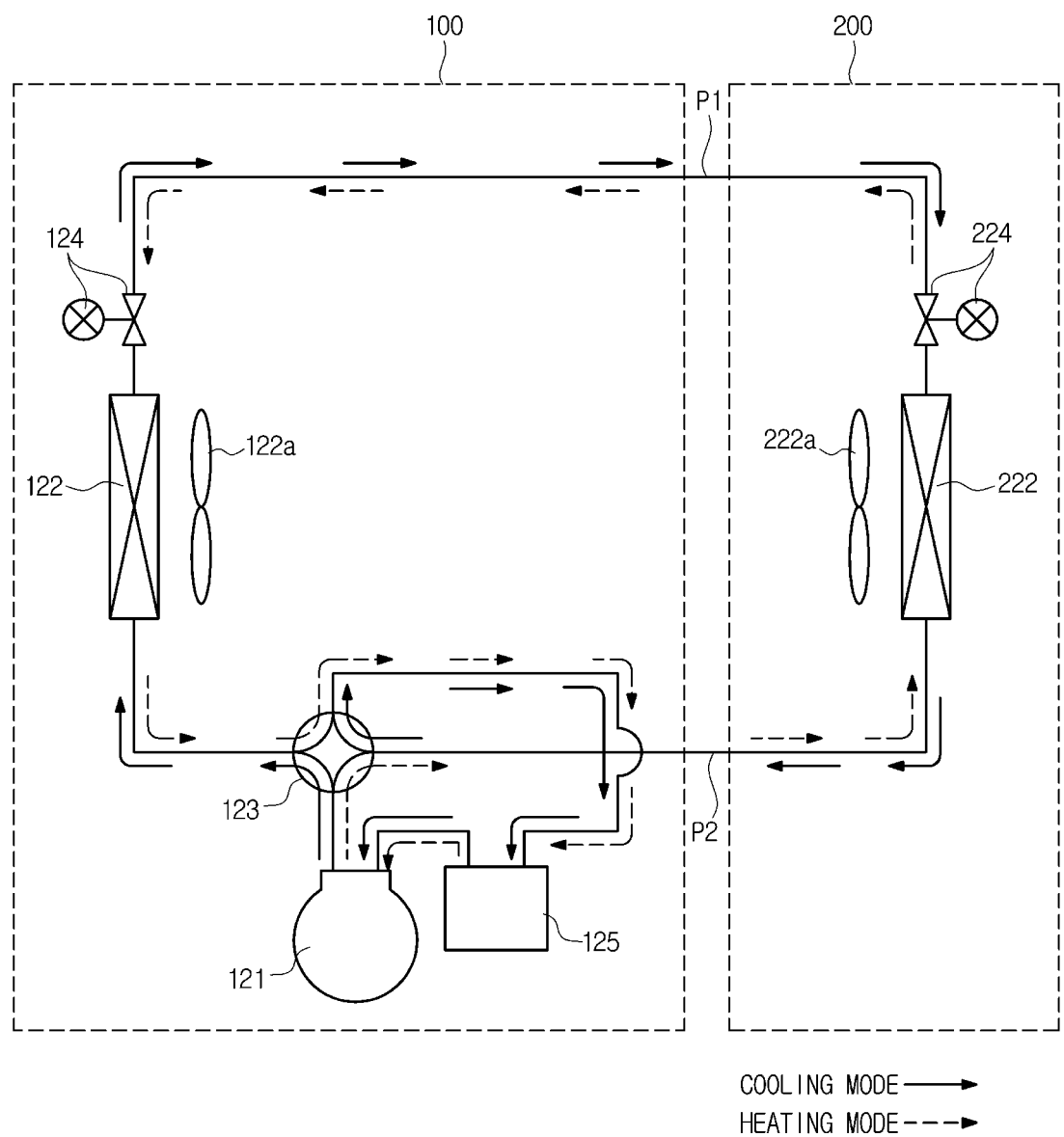
FIG. 2 is a view illustrating a configuration related to a flow of a refrigerant in the air conditioner according to an embodiment of the disclosure.

FIG. 2 is a view illustrating a configuration related to a flow of a refrigerant in the air conditioner 1 according to an embodiment of the disclosure.

Referring to FIG. 2, as well as the outdoor unit 100 and indoor unit 200, the air conditioner 1 includes a liquid pipe P1 corresponding a flow path connecting the outdoor unit 100 and indoor unit 200, and on which a liquid refrigerant flows, and a gas pipe P2 on which a gaseous refrigerant flows. The liquid pipe P1 and the gas pipe P2 may extend to the inside of the indoor unit 200 and the outdoor unit 100.

The outdoor unit 100 includes a compressor 121 compressing the refrigerant, an outdoor heat exchanger 122 performing heat exchange between the outdoor air and the refrigerant, a four-way valve 123 selectively guiding the refrigerant, which is compressed by the compressor 121, to either the outdoor heat exchanger 122 or the indoor unit 200 according to a heating mode or a cooling mode, an outdoor expansion valve 124 decompressing the refrigerant guided to the outdoor heat exchanger 122 in the heating mode, and an accumulator 125 preventing a liquid refrigerant, which is not evaporated, from flowing to the compressor 121.

The compressor 121 compresses a low-pressure gaseous refrigerant to a high pressure by using a rotational force of a compressor motor (not shown) that receives electric energy from an external power source and rotates.

The four-way valve 123 guides the refrigerant compressed in the compressor 121 to the outdoor heat exchanger 122 in the cooling mode, and guides the refrigerant compressed in the compressor 121 to the indoor unit 200 in the heating mode.

The outdoor heat exchanger 122 condenses the refrigerant compressed by the compressor 121 in the cooling mode and evaporates the refrigerant decompressed by the indoor unit 200 in the heating mode. The outdoor heat exchanger 122 may include an outdoor heat exchanger refrigerant pipe (not shown) on which the refrigerant flows, an outdoor heat exchanger cooling fin (not shown) improving the heat exchange efficiency between the refrigerant and the outdoor air by increasing the surface area of the outdoor heat exchanger refrigerant pipe (not shown), and a cooling fan 122a blowing outdoor air to the outdoor heat exchanger 122.

In the heating mode, as well as decompressing the refrigerant, the outdoor expansion valve 124 may regulate an amount of refrigerant supplied to the outdoor heat exchanger 122 so that sufficient heat exchange is performed in the outdoor heat exchanger 122. Particularly, the outdoor expansion valve 124 decompresses the refrigerant by utilizing a throttling action of the refrigerant that is a pressure of the refrigerant decreases without heat exchange with the outside when the refrigerant passes through a narrow channel. The outdoor expansion valve 124 may employ an electromagnetic valve configured to regulate an opening degree of the outdoor expansion valve 124 to regulate the amount of the refrigerant passing through the outdoor expansion valve 124.

The indoor unit 200 includes an indoor heat exchanger 222 performing heat exchange between the refrigerant and the indoor air and an indoor expansion valve 224 decompressing the refrigerant supplied to the indoor heat exchanger 222 in the cooling mode.

The indoor heat exchanger 222 evaporates a low-pressure liquid refrigerant in the cooling mode and condenses a high-pressure gaseous refrigerant in the heating mode. Like the outdoor heat exchanger 122 of the outdoor unit 100, the indoor heat exchanger 222 may include an indoor heat exchanger refrigerant pipe (not shown) on which the refrigerant flows, an indoor heat exchanger cooling fin (not shown) improving the heat exchange efficiency between the refrigerant and the indoor air by increasing the surface area of the indoor heat exchanger refrigerant pipe (not shown), and a blowing fan 222a blowing the air, which is heat exchanged with the refrigerant by the indoor heat exchanger 222, to the indoor space.

As well as decompressing the refrigerant by utilizing the throttling action, the indoor expansion valve 224 may regulate an amount of refrigerant supplied to the indoor heat exchanger 222 so that sufficient heat exchange is performed in the indoor heat exchanger 222. The indoor expansion valve 224 may employ an electromagnetic valve configured to regulate an opening degree of the indoor expansion valve 224 to regulate the amount of the refrigerant passing through the indoor expansion valve 224.

Hereinafter an operation mode of the air conditioner 1, that is, the flow of the refrigerant according to the cooling mode or the heating mode will be described.

When the air conditioner 1 operates in the cooling mode, the refrigerant is compressed to a high pressure by the compressor 121 of the outdoor unit 100. As the refrigerant is compressed, the pressure and temperature of the refrigerant is increased.

The compressed refrigerant is guided to the outdoor heat exchanger 122 by the four-way valve 123. The refrigerant guided to the outdoor heat exchanger 122 is condensed in the outdoor heat exchanger 122, and heat exchange is performed between the refrigerant and the outdoor air while the refrigerant is condensed. Particularly, while a state of the refrigerant is changed from a gaseous state to a liquid state, the refrigerant releases energy (latent heat) as much as the difference between internal energy of the refrigerant in the gaseous state and internal energy of the refrigerant in the liquid state, to the outside.

After passing through the outdoor expansion valve 124, the condensed liquid refrigerant is supplied to the indoor unit 200 along the liquid pipe P1.

The liquid refrigerant provided to the indoor unit 200 is decompressed by the indoor expansion valve 224 provided on the liquid pipe P1 while the temperature of the refrigerant is reduced. Particularly, the indoor expansion valve 224 decompresses the refrigerant by utilizing the throttling action of the refrigerant that is a pressure of the refrigerant decreases without heat exchange with the outside when the fluid passes through a narrow channel.

The indoor expansion valve 224 may employ an electromagnetic valve configured to regulate an opening degree to regulate the amount of the refrigerant flowing to the indoor expansion valve 224.

The decompressed liquid refrigerant is evaporated by the indoor heat exchanger 222, and heat exchange is performed between the refrigerant and the indoor air while the refrigerant is evaporated. Particularly, while a state of the refrigerant is changed from the liquid state to the gaseous state, the refrigerant absorbs energy (latent heat) as much as the difference between internal energy of the refrigerant in the gaseous state and internal energy of the refrigerant in the liquid state, from the indoor air.

As mentioned above, in the cooling mode, the air conditioner 1 may cool the indoor air using heat exchange between the refrigerant generated in the indoor heat exchanger 222 and the indoor air, that is, the air conditioner 1 may cool the indoor air by using the refrigerant absorbing the latent heat from the indoor air.

The evaporated gaseous refrigerant is supplied to the outdoor unit 100 through the gas pipe P2 and supplied to the accumulator 125 via the four-way valve 123. In the accumulator 125, the refrigerant is separated into the liquid refrigerant, which is not evaporated, and the evaporated gaseous refrigerant, and the gaseous refrigerant is supplied to the compressor 121 again.

The gaseous refrigerant supplied to the compressor 121 is compressed by the compressor 121 and thus the above mentioned refrigerant cycle is repeated.

The heat exchange by the refrigerant in the air conditioner 1 in the cooling mode is summarized that the refrigerant absorbs the thermal energy of the indoor air by the indoor heat exchanger 222 of the indoor unit 200 and releases the thermal energy to the outdoor space by the outdoor heat exchanger 122 of the outdoor heat exchanger 100, thereby transferring the indoor thermal energy to the outdoor space.

When the air conditioner 1 operates in the heating mode, the refrigerant is compressed to a high pressure by the compressor 121 of the outdoor unit 100, and the temperature of the refrigerant is increased with the pressure of the refrigerant.

After passing through the four-way valve 123, the compressed refrigerant is guided to the indoor unit 200 along the gas pipe P2.

The refrigerant is condensed by the indoor heat exchanger 222, and heat exchange is performed between the refrigerant and the indoor air while the refrigerant is condensed. Particularly, while a state of the refrigerant is changed from the gaseous state to the liquid state, the refrigerant releases energy (latent heat) as much as the difference between internal energy of the refrigerant in the gaseous state and internal energy of the refrigerant in the liquid state, to the indoor space. As mentioned above, in the heating mode, the air conditioner 1 may heat the indoor air using heat exchange between the refrigerant generated in the indoor heat exchanger 222 and the indoor air, that is, the air conditioner 1 may heat the indoor air by using the refrigerant releasing the latent heat.

After passing through the indoor expansion valve 224, the condensed liquid refrigerant is supplied to the outdoor unit 100 again along the liquid pipe P1.

The liquid refrigerant supplied to the outdoor unit 100 is decompressed by the outdoor expansion valve 124 provided on the liquid pipe P1 while the temperature of the refrigerant is reduced. The outdoor expansion valve 124 may employ an electromagnetic valve configured to regulate an opening degree to regulate the amount of the refrigerant flowing to the outdoor heat exchanger 122.

The decompressed liquid refrigerant is evaporated by the outdoor heat exchanger 122, and heat exchange is performed between the refrigerant and the outdoor air while the refrigerant is evaporated. Particularly, while a state of the refrigerant is changed from the liquid state to the gaseous state, the refrigerant absorbs energy (latent heat) as much as the difference between internal energy of the refrigerant in the gaseous state and internal energy of the refrigerant in the liquid state, from the outdoor air.

The gaseous refrigerant evaporated by the outdoor heat exchanger 122 is supplied to the accumulator 125 via the four-way valve 123. In the accumulator 125, the refrigerant is separated into the liquid refrigerant, which is not evaporated, and the evaporated gaseous refrigerant, and the gaseous refrigerant is supplied to the compressor 121 again.

The gaseous refrigerant supplied to the compressor 121 is compressed by the compressor 121 and thus the refrigerant cycle is repeated.

The heat exchange by the refrigerant in the air conditioner 1 in the heating mode is summarized that the refrigerant absorbs the thermal energy of the outdoor air by the outdoor heat exchanger 122 of the outdoor unit 100 and releases the thermal energy to the indoor space by the indoor heat exchanger 222 of the indoor heat exchanger 200, thereby transferring the outdoor thermal energy to the indoor space.

Hereinbefore the refrigerant flow among components contained in the air conditioner 1 has been described. Hereinafter the signal flow among components contained in the air conditioner 1 will be described.

Figure 3:
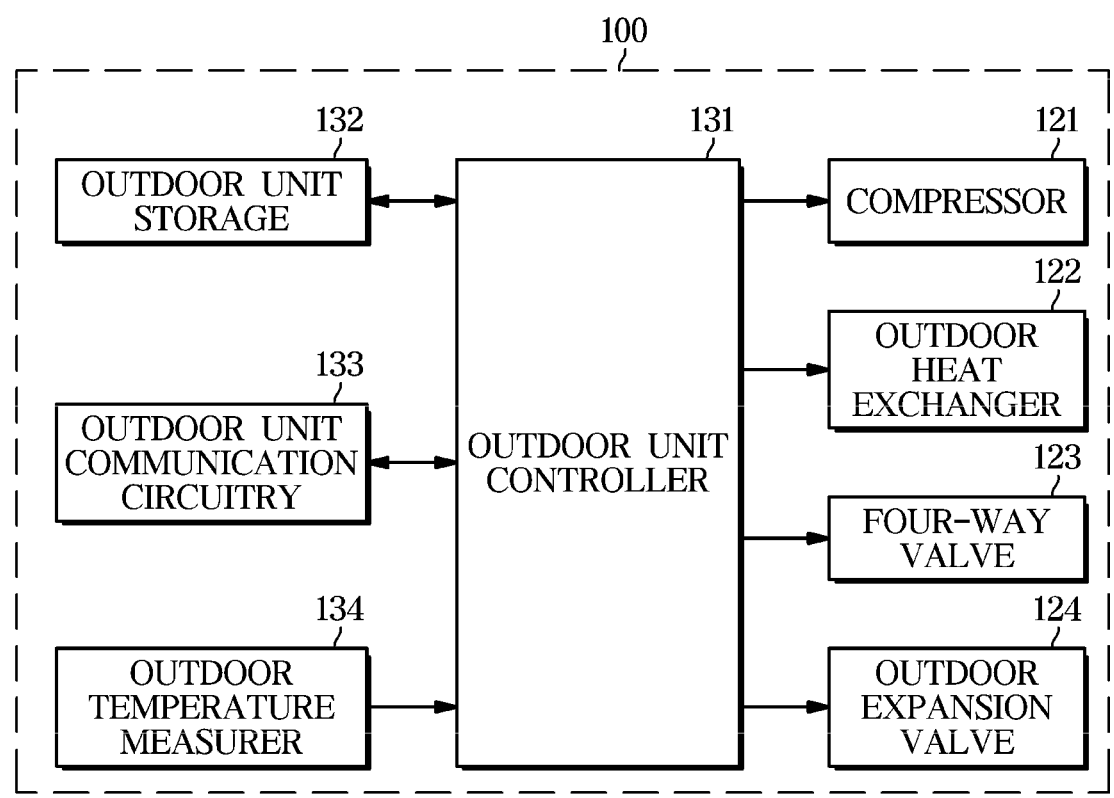
FIG. 3 is a block diagram illustrating a control signal flow of an outdoor unit contained in the air conditioner according to an embodiment of the disclosure.

FIG. 3 is a block diagram illustrating a control signal flow of the outdoor unit 100 contained in the air conditioner 1 according to an embodiment of the disclosure.

Referring to FIG. 3, the outdoor unit 100 includes an outdoor unit controller 131 configured to control the compressor 121, the outdoor heat exchanger 122, the four-way valve 123 and the outdoor expansion valve 124, which are contained in the outdoor unit 100, according to the cooling mode or the heating mode, and configured to change an operation mode of the air conditioner 1 based on the outdoor temperature and the indoor temperature, an outdoor unit storage 132 configured to store programs and data related to the operation of the outdoor unit 100 and programs and data related to the operation mode change of the air conditioner 1, an outdoor unit communication circuitry 133 configured to communicate with the indoor unit 200, and an outdoor temperature measurer 134 configured to measure an outdoor temperature.

The outdoor unit controller 131 may control the components contained in the outdoor unit 100 according to the cooling mode or the heating mode.

Particularly, when the air conditioner 1 is in the cooling mode, the outdoor unit controller 131 may control the compressor 121 to compress the refrigerant and control the four-way valve 123 to supply the compressed refrigerant to the outdoor heat exchanger 122, and control the outdoor heat exchanger 122 to condense the compressed refrigerant.

When the air conditioner 1 is in the heating mode, the outdoor unit controller 131 may control the compressor 121 to compress the refrigerant and control the four-way valve 123 to supply the compressed refrigerant to the indoor unit 200, and control the outdoor expansion valve 124 to decompress the liquid refrigerant supplied from the indoor unit 200, and control the outdoor heat exchanger 122 to evaporate the decompressed liquid refrigerant.

The outdoor unit controller 131 according to an embodiment may change the operation mode of the air conditioner 1 based on the outdoor temperature and the indoor temperature.

Particularly, the outdoor unit controller 131 may determine duration corresponding to the outdoor temperature measured by the outdoor temperature measurer 134.

In this case, the duration means a period of time that is required to be maintained at a reference temperature of the mode change for the mode change. That is, when the indoor temperature is maintained at the reference temperature or greater for the duration, the operation mode of the air conditioner 1 may be changed.

The outdoor unit controller 131 may determine duration corresponding to a measured outdoor temperature based on duration information stored in the outdoor unit storage 132. A description of determining the duration will be described in detail later.

When the indoor temperature measured by an indoor temperature measurer 234 described later is maintained at a first reference indoor temperature or more, which is a reference temperature for a change to the cooling mode, for the determined duration, the outdoor unit controller 131 may change the heating mode to the cooling mode.

When the indoor temperature measured by the indoor temperature measurer 234 is maintained at a second reference indoor temperature or less, which is a reference temperature for a change to the heating mode, for the determined duration, the outdoor unit controller 131 may change the cooling mode to the heating mode. The changing of the operation mode will be described in detail later.

The outdoor unit controller 131 may include at least one memory for storing a program for performing the above-described operation and the operation to be described later, and at least one processor for executing the stored program. When there are a plurality of memories and processors, they may be integrated on one chip or provided in physically separated positions.

According to an embodiment, the outdoor unit storage 132 may store programs and data related to the operation mode change of the air conditioner 1. Particularly, the outdoor unit storage 132 may store duration information indicating the relationship between the outdoor temperature and the duration time, and may store the first reference indoor temperature and the second reference indoor temperature, which are set to the reference temperature of the mode change.

According to an embodiment, the outdoor unit storage 132 may store predetermined basic duration, store the set temperature of the indoor temperature input through the indoor unit inputter 235 described later, and a variety of information related to the outdoor unit 100.

To store a variety of information, the outdoor unit storage 132 may be implemented by at least one of a non-volatile memory such as a cache, a read only memory (ROM), a programmable ROM (PROM), an erasable programmable ROM (EPROM), and a flash memory, a volatile memory such as a Random Access memory (RAM) or a storage medium such as hard disk drive (HDD) and CD-ROM, but is not limited thereto.

According to an embodiment, the outdoor unit communication circuitry 133 may communicate with the indoor unit 200. Particularly, the outdoor unit communication circuitry 133 may exchange information with an indoor unit communication circuitry 233 described later. That is, the outdoor unit communication circuitry 133 may exchange information with the indoor unit communication circuitry 233 through wired/wireless communication.

The wireless communication may use at least one of 5th generation (5G) mobile telecommunication, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM), which are cellular communication protocol. In addition, the wireless communication may include local communication. The local communication may include at least one of wireless fidelity (WiFi), Bluetooth, or near field communication (NFC).

The wired communication may include at least one of universal serial bus (USB), high definition multimedia interface (HDMI), a recommended standard 232 (RS-232), or plain old telephone service (POTS).

For example, the outdoor unit communication circuitry 133 may transmit the outdoor temperature measured by the outdoor temperature measurer 134 to the indoor unit communication circuitry 233 to share the outdoor temperature with the indoor unit 200.

The outdoor unit communication circuitry 133 may receive the indoor temperature measured by the indoor temperature measurer 234 from the indoor unit communication circuitry 233 and may share the indoor temperature with the indoor unit 200, may receive a set temperature, which is set through an indoor unit inputter 235, from the indoor unit communication circuitry 233.

The outdoor temperature measurer 134 outputs an electrical signal corresponding to the measured temperature. The outdoor temperature measurer 134 may include a thermistor in which electrical resistance varies with temperature.

Figure 4:
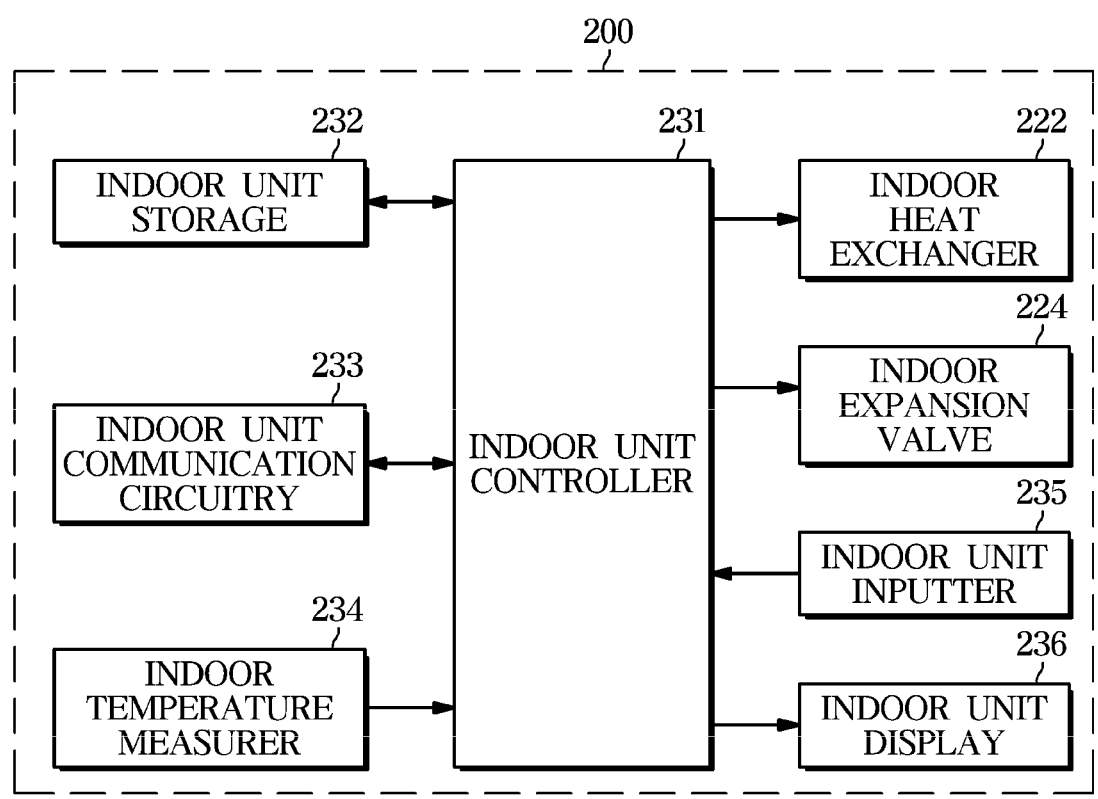
FIG. 4 is a block diagram illustrating a control signal flow of an indoor unit contained in the air conditioner according to an embodiment of the disclosure.

FIG. 4 is a block diagram illustrating a control signal flow of an indoor unit 200 contained in the air conditioner 1 according to an embodiment.

Referring to FIG. 4, the indoor unit 200 includes an indoor unit controller 231 configured to control the door heat exchanger 222, and the indoor expansion valve 224, which are contained in the indoor unit 200, according to the cooling mode or the heating mode, and configured to change an operation mode of the air conditioner 1 based on the outdoor temperature and the indoor temperature, an indoor unit storage 232 configured to store programs and data related to the operation of the indoor unit 200 and programs and data related to the operation mode change of the air conditioner 1, the indoor unit communication circuitry 233 configured to communicate with the outdoor unit 100, the indoor temperature measure 234 configured to measure an indoor temperature of an indoor space in which the indoor unit 200 is placed, the indoor inputter 235 configured to receive an operation command about the indoor unit 200 from a user, and an indoor display 236 configured to display operation information of the indoor unit 200.

According to an embodiment, the indoor unit controller 231 may control the components contained in the indoor unit 200 according to the cooling mode or the heating mode.

Particularly, when the air conditioner 1 is in the cooling mode, the indoor unit controller 231 may control the indoor expansion valve 224 to decompress the liquid refrigerant supplied from the outdoor unit 100, and control the indoor heat exchanger 222 to evaporate the decompressed liquid refrigerant.

When the air conditioner 1 is in the heating mode, the indoor unit controller 231 may control the indoor heat exchanger 222 to condense the compressed refrigerant supplied from the outdoor unit 100.

The indoor unit controller 231 according to an embodiment may change the operation mode of the air conditioner 1 based on the outdoor temperature and the indoor temperature.

Particularly, the indoor unit controller 231 may determine duration corresponding to the outdoor temperature measured by the outdoor temperature measurer 234.

The indoor unit controller 231 may determine duration corresponding to a measured indoor temperature based on duration information stored in the indoor unit storage 232. A description of determining the duration will be described in detail later.

When the indoor temperature measured by the indoor temperature measurer 234 is maintained at the first reference indoor temperature or greater, which is a reference temperature for a change to the cooling mode, for the determined duration, the indoor unit controller 231 may change the heating mode to the cooling mode.

When the indoor temperature measured by the indoor temperature measurer 234 is maintained at a second reference indoor temperature or less, which is a reference temperature for a change to the heating mode, for the determined duration, the indoor unit controller 231 may change the cooling mode to the heating mode. The change of the operation mode will be described in detail later.

The indoor unit controller 231 may include at least one memory for storing a program for performing the above-described operation and the operation to be described later, and at least one processor for executing the stored program. When there are a plurality of memories and processors, they may be integrated on one chip or provided in physically separated positions.

According to an embodiment, the indoor unit storage 232 may store programs and data related to the operation mode change of the air conditioner 1. Particularly, the indoor unit storage 232 may store duration information indicating the relationship between the outdoor temperature and the duration time, and may store the first reference indoor temperature and the second reference indoor temperature set as reference temperatures for the mode change.

According to an embodiment, the indoor unit storage 232 may store predetermined basic duration, store the set temperature of the indoor temperature input through the indoor unit inputter 235, and a variety of information related to the indoor unit 200.

To store a variety of information, the indoor unit storage 232 may be implemented by at least one of a non-volatile memory such as a cache, a read only memory (ROM), a programmable ROM (PROM), an erasable programmable ROM (EPROM), and a flash memory, a volatile memory such as a Random Access memory (RAM) or a storage medium such as hard disk drive (HDD) and CD-ROM, but is not limited thereto.

According to an embodiment, the indoor unit communication circuitry 233 may communicate with the outdoor unit 100. Particularly, the indoor unit communication circuitry 233 may exchange information with the outdoor unit communication circuitry 133. That is, the indoor unit communication circuitry 233 may exchange information with the outdoor unit communication circuitry 133 through wired/wireless communication.

Further, the indoor unit communication circuitry 233 may transmit/receive information to/from an external communication device through wired/wireless communication. According to an embodiment, the external communication device may correspond to a remote controller of the air conditioner 1 capable of setting a set temperature or the like by a user inputting a button.

The wireless communication may use at least one of 5th generation (5G) mobile telecommunication, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM), which are cellular communication protocol. In addition, the wireless communication may include local communication. The local communication may include at least one of wireless fidelity (WiFi), Bluetooth, or near field communication (NFC).

The wired communication may include at least one of universal serial bus (USB), high definition multimedia interface (HDMI), a recommended standard 232 (RS-232), or plain old telephone service (POTS).

For example, the indoor unit communication circuitry 233 may receive the outdoor temperature measured by the outdoor temperature measurer 134 from the outdoor unit communication circuitry 133 and may share the outdoor temperature with the outdoor unit 100.

The indoor unit communication circuitry 233 may transmit the indoor temperature measured by the indoor temperature measurer 234 to the outdoor unit communication circuitry 133 to share the indoor temperature with the outdoor unit 100, and may transmit a set temperature, which is set through the indoor unit inputter 235, to the outdoor unit communication circuitry 133.

The indoor temperature measurer 234 outputs an electrical signal corresponding to the measured temperature. The indoor temperature measurer 234 may include a thermistor in which electrical resistance varies with temperature.

According to an embodiment, the indoor unit inputter 235 may receive an input from a user. The indoor unit inputter 235 may include a button type switch, a membrane switch or a touch panel to receive an operation command for the indoor unit 200 or the air conditioner 1, and include the operation panel 212 configured to receive an operation command for the air conditioner 1 from a user.

Particularly, the indoor unit inputter 235 may receive a set temperature of the indoor temperature, and the operation mode of the air conditioner 1 from a user.

In addition, the indoor unit inputter 235 may receive a reference temperature of an outdoor temperature for reducing duration for a change to the cooling mode, and receive a reference temperature of an outdoor temperature for reducing duration for a change to the heating mode.

The indoor unit inputter 235 may receive a first critical temperature to calculate a first reference indoor temperature that is set to the reference temperature for a change to the cooling mode. The indoor unit controller 231 or the outdoor unit controller 131 may set the first reference indoor temperature to a temperature greater than the input set temperature by the first critical temperature.

Further, the indoor unit inputter 235 may receive a second critical temperature to calculate a second reference indoor temperature that is set to the reference temperature for a change to the heating mode. The indoor unit controller 231 or the outdoor unit controller 131 may set the second reference indoor temperature to a temperature less than the input set temperature by the second critical temperature.

According to an embodiment, the indoor unit display 236 may display operation information of the indoor unit 200. The indoor unit display 236 may include a liquid crystal display (LCD) panel or a light emitting diode (LED) panel for displaying the operation information of the indoor unit 200 or the air conditioner 1. The indoor unit display 236 may include a display panel 213 displaying operation information of the air conditioner 1.

Particularly, the indoor unit display 236 may display the indoor temperature measured by the indoor temperature measurer 234, and may display the set temperature input through the indoor unit inputter 235.

The indoor unit controller 235 and the indoor unit display 236 may include a touch screen panel (TSP) in which the indoor unit controller 235 and the indoor unit display 236 are integrated.

Hereinbefore the configuration of the air conditioner 1 has been described. Hereinafter a method of changing an operation mode of the air conditioner 1 based on an outdoor temperature and an indoor temperature will be described.

The operation of mode change to be described later may be performed by the outdoor unit controller 131 or the indoor unit controller 231 according to an embodiment. Hereinafter the air conditioner 1 will be described as a subject of the operation of mode change, but a specific operation of mode change may be performed by the outdoor unit controller 131 or the indoor unit controller 231.

Figure 5:
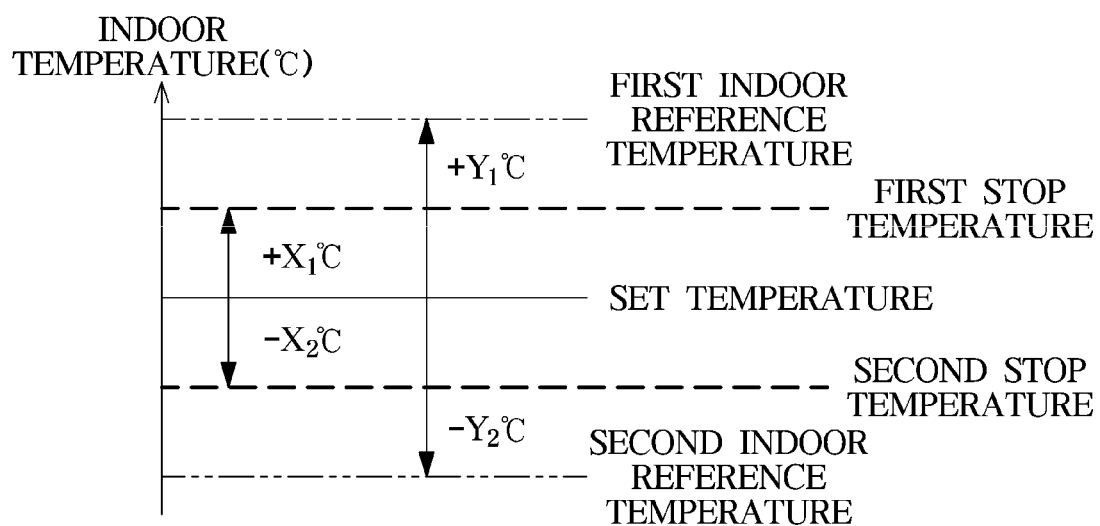
FIG. 5 is a view illustrating a mode change based on a set temperature of the air conditioner according to an embodiment of the disclosure.
Figure 6:
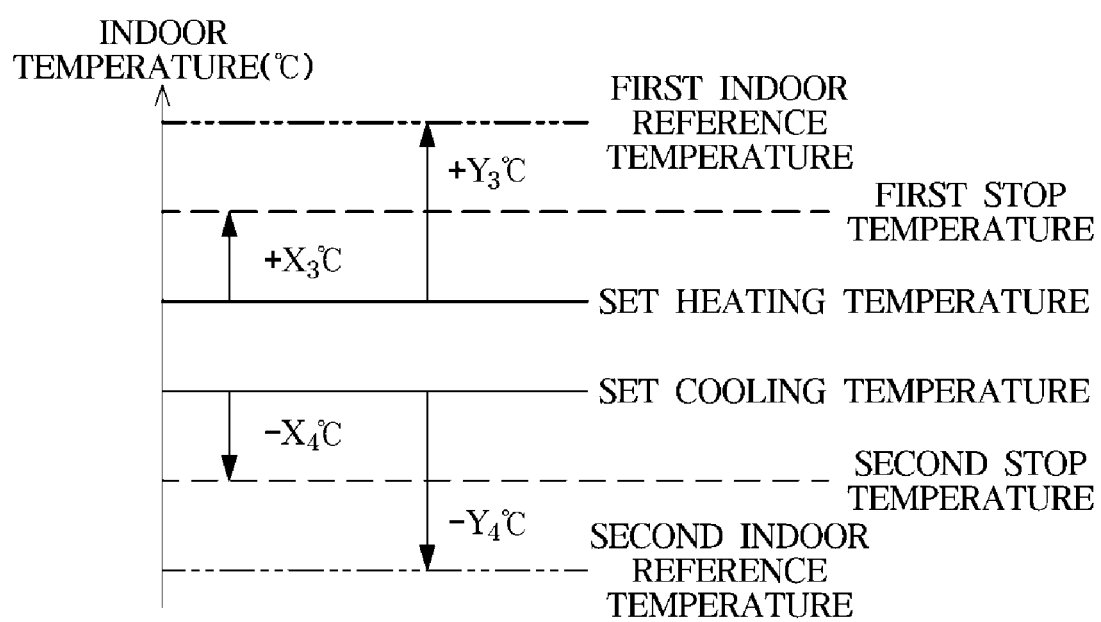
FIG. 6 is a view illustrating a mode change based on a set heating temperature and a set cooling temperature of the air conditioner according to an embodiment of the disclosure.

FIG. 5 is a view illustrating a mode change based on a set temperature of the air conditioner 1 according to an embodiment, and FIG. 6 is a view illustrating a mode change based on a set heating temperature and a set cooling temperature of the air conditioner 1 according to an embodiment.

Referring to FIG. 5, the air conditioner 1 may change the operation mode of the air conditioner 1 based on the indoor temperature measured by the indoor temperature measurer 234.

At this time, the set temperature and the operation mode of the air conditioner 1 may be set based on the user's input.

When the operation mode of the air conditioner 1 corresponds to the heating mode, the air conditioner 1 may control each component of the air conditioner 1 so that an indoor temperature of the indoor space in which the indoor unit 200 is placed, reaches the set temperature.

The air conditioner 1 may stop the operation when the indoor temperature exceeds the set temperature and reaches a first stop temperature. Particularly, the air conditioner 1 may stop the flow of the refrigerant by controlling each components of the air conditioner 1 when the indoor temperature reaches the first stop temperature that is greater than the set temperature by a set critical temperature $X_1$° C.

The set critical temperature $X_1$° C. may be set by a designer in the initial design, and alternatively, may be set by being received from a user through the indoor unit inputter 235.

Further, when the indoor temperature exceeds the first stop temperature and reaches the first reference indoor temperature corresponding to the reference temperature for a change to the cooling mode, the air conditioner 1 may change the operation mode from the heating mode to the cooling mode.

That is, the air conditioner 1 changes the operation mode of the air conditioner 1 from the heating mode to the cooling mode when the indoor temperature reaches the first reference indoor temperature which is greater than the set temperature by a first critical temperature $Y_1°$ C.

The set first critical temperature $Y_1°$ C. may be set by a designer in the initial design, and alternatively, may be set by being received from a user through the indoor unit inputter 235. That is, a user of the air conditioner 1 may set the first reference indoor temperature in which the operation mode is changed to the cooling mode based on the set temperature, by setting the first critical temperature $Y_1°$ C.

Particularly, the air conditioner 1 may change the operation mode of the air conditioner 1 from the heating mode to the cooling mode when the indoor temperature is maintained at the first reference indoor temperature or greater for the predetermined basic duration.

The predetermined basic duration is for preventing the operating mode of the air conditioner 1 from being frequently changed, and may be set to 5 minutes or more and 60 minutes or less by the designer or the user.

However, the air conditioner 1 may determine duration that is shorter than the predetermined basic duration in consideration of the outdoor temperature.

When the operation mode is selected based on only the indoor temperature, the mode change may be delayed according to the predetermined basic duration although a load on the mode change is increased because heat is transferred from the outside to the indoor space due to the increase of the outdoor temperature.

Accordingly, the air conditioner 1 according to an embodiment may determine duration that corresponds to the outdoor temperature and that is shorter than the predetermined basic duration, based on the measured outdoor temperature measured by the outdoor temperature measurer 134. A method of determining duration corresponding to the measured outdoor temperature will be described in detail later.

In other words, when the measured indoor temperature is maintained at the first reference indoor temperature or greater for the duration, which is determined based on the measured outdoor temperature, the air conditioner 1 may change the operation mode of the air conditioner 1 from the heating mode to the cooling mode.

The air conditioner 1 changed to the cooling mode may control each components of the air conditioner 1 so that the refrigerant absorbs the thermal energy of the indoor air by the indoor heat exchanger 222 of the indoor unit 200 and releases the thermal energy to the outside by the outdoor heat exchanger 122 of the outdoor unit 100, thereby transferring the indoor thermal energy to the outdoor space.

Accordingly, the air conditioner 1 operates to allow the indoor temperature to be maintained at a set temperature that is set by a user, based on the outdoor temperature.

When the operation mode of the air conditioner 1 corresponds to the cooling mode, the air conditioner 1 may control each of components of the air conditioner 1 so that the indoor temperature of the indoor space in which the indoor unit 200 is placed reaches the set temperature.

The air conditioner 1 may stop the operation when the indoor temperature exceeds the set temperature and reaches a second stop temperature. Particularly, the air conditioner 1 controls each components of the air conditioner 1 to stop the flow of the refrigerant when the indoor temperature reaches the second stop temperature which is less than the set temperature by a set critical temperature $X_2°$ C.

The set critical temperature $X_2°$ C. may be set by a designer in the initial design, and alternatively, may be set by being received from a user through the indoor unit inputter 235.

Further, when the indoor temperature exceeds the second stop temperature and reaches the second reference indoor temperature corresponding to the reference temperature for a change to the heating mode, the air conditioner 1 may change the operation mode from the cooling mode to the heating mode.

That is, the air conditioner 1 may change the operation mode of the air conditioner 1 from the cooling mode to the heating mode when the indoor temperature reaches the second reference indoor temperature which is less than the set temperature by a second critical temperature $Y_2°$ C.

The set second critical temperature $Y_2°$ C. may be set by a designer in the initial design, and alternatively, may be set by being received from a user through the indoor unit inputter 235. That is, a user of the air conditioner 1 may set the second reference indoor temperature in which the operation mode is changed to the heating mode based on the set temperature, by setting the second critical temperature $Y_2°$ C.

Particularly, the air conditioner 1 may change the operation mode of the air conditioner 1 from the cooling mode to the heating mode when the indoor temperature is maintained at the second reference indoor temperature or less for the predetermined basic duration.

The predetermined basic duration is for preventing the operating mode of the air conditioner 1 from being frequently changed, and may be set to 5 minutes or more and 60 minutes or less by the designer or the user.

However, the air conditioner 1 may determine duration that is shorter than the predetermined basic duration in consideration of the outdoor temperature.

When the operation mode is selected based on only the indoor temperature, the mode change may be delayed according to the predetermined basic duration although a load on the mode change is increased because heat is transferred from the indoor space to the outdoor space due to the decrease of the outdoor temperature.

Accordingly, the air conditioner 1 according to an embodiment may determine duration that corresponds to the outdoor temperature and that is shorter than the predetermined basic duration, based on the measured outdoor temperature measured by the outdoor temperature measurer 134. A method of determining duration corresponding to the measured outdoor temperature will be described in detail later.

In other words, when the measured indoor temperature is maintained at the second reference indoor temperature or less for the duration, which is determined based on the measured outdoor temperature, the air conditioner 1 may change the operation mode of the air conditioner 1 from the cooling mode to the heating mode.

The air conditioner 1 changed to the heating mode may control each components of the air conditioner 1 so that the refrigerant absorbs the thermal energy of the outdoor air by the outdoor heat exchanger 122 of the outdoor unit 100 and releases the thermal energy to the indoor space by the indoor heat exchanger 222 of the indoor unit 100, thereby transferring the outdoor thermal energy to the indoor space.

Accordingly, the air conditioner 1 operates to allow the indoor temperature to be maintained at the set temperature that is set by a user, based on the outdoor temperature.

Referring to FIG. 6, the air conditioner 1 according to an embodiment may individually set a set heating temperature and a set cooling temperature. The set heating temperature corresponds to an indoor temperature set when the air conditioner 1 operates in the heating mode, and the set cooling temperature corresponds to an indoor temperature set when the air conditioner 1 operates in the cooling mode.

That is, a user of the air conditioner 1 may individually set the set temperature according to the operation mode of the air conditioner 1. Particularly, the user can set the set heating temperature, which is the set temperature when the air conditioner 1 is set to the heating mode, and set the set cooling temperature, which is the set temperature when the air conditioner 1 is set to the cooling mode.

At this time, when the air conditioner 1 operates in the heating mode, the first stop temperature, which is set to the reference temperature for stopping the operation, may be set to a temperature that is greater than the set heating temperature by a set critical temperature $X_3°$ C. The first reference indoor temperature, which is set to the reference temperature for a change to the cooling mode, may be set to a temperature that is greater than the set heating temperature by a third critical temperature $Y_3°$ C.

The set critical temperature $X_3°$ C. may be set by a designer in the initial design, and alternatively, may be set by being received from a user through the indoor unit inputter 235.

The third critical temperature $Y_3°$ C. may be set by a designer in the initial design, and alternatively, may be set by being received from a user through the indoor unit inputter 235. That is, a user of the air conditioner 1 may set the first reference indoor temperature in which the operation mode is changed to the cooling mode based on the set heating temperature, by setting the third critical temperature $Y_3°$ C.

Further, when the air conditioner 1 operates in the cooling mode, the second stop temperature, which is set to the reference temperature for stopping the operation, may be set as a temperature that is less than the set heating temperature by a set critical temperature $X_4°$ C. The second reference indoor temperature, which is set to the reference temperature for a change to the heating mode, may be set as a temperature that is less than the set heating temperature by a fourth critical temperature $Y_4°$ C.

The set critical temperature $X_4°$ C. may be set by a designer in the initial design, and alternatively, may be set by being received from a user through the indoor unit inputter 235.

The fourth critical temperature $Y_4°$ C. may be set by a designer in the initial design, and alternatively, may be set by being received from a user through the indoor unit inputter 235. That is, a user of the air conditioner 1 may set the second reference indoor temperature in which the operation mode is changed to the heating mode based on the set cooling temperature, by setting the fourth critical temperature $Y_4°$ C.

FIG. 7 is a view illustrating first duration information 700 used for changing a heating mode to a cooling mode in the air conditioner 1 according to an embodiment, and FIG. 8 is a view illustrating second duration information 800 used for changing the cooling mode to the heating mode in the air conditioner 1 according to an embodiment.

Referring to FIG. 7, according to an embodiment, the first duration information 700 may include information on first duration that is required to be maintained at the first reference indoor temperature, which is set to a reference temperature for the mode change, for changing the heating mode to the cooling mode.

The first duration information 700 may include a plurality of set numbers and information about the first duration corresponding to each of the plurality of set numbers.

For example, the first duration information 700 indicates that first duration corresponding to a first set number '1' is 30 minutes. The first duration of the set number '1' is set to 30 minutes regardless of the outdoor temperature that is the outdoor temperature is not considered.

In addition, the first duration information 700 indicates that the first duration corresponding to a set number '2' is 1 minute when the outdoor temperature is 30° C. or greater and the set number '2' is 30 minutes when the outdoor temperature is less than 30° C. The outdoor temperature is considered in the first duration of the set number '2', which may vary according to the outdoor temperature.

That is, the first duration information 700 includes information on the predetermined basic duration, information on the first reference outdoor temperature set to a reference temperature for reducing the duration for a change to the cooling mode, and information on duration that is shorter than the predetermined basic duration when the outdoor temperature is equal to or greater than the first reference outdoor temperature.

As illustrated in FIG. 7, the predetermined basic duration may be 30 minutes, which may vary according to the user's input. The duration that is reduced according to the outdoor temperature may be one minute, which may vary according to the user's input.

The first reference outdoor temperature, which is set to the reference temperature for reducing the duration for a change to the cooling mode, may vary according to the set number, and the first reference outdoor temperature of each set number may vary according to the user's input.

In addition, the user can set the set number on the first duration information 700 for determining the first duration, through the indoor unit inputter 235, and the air conditioner 1 may determine the first duration information 700 based on the set number.

The first duration information 700 may be stored in the outdoor unit storage 132 and the indoor unit storage 232. Although it is described that the first duration information 700 includes only the set numbers 1 to 4, the disclosure is not limited thereto, and a plurality of set numbers may be contained.

When the outdoor temperature measured by the outdoor temperature measurer 134 is less than the first reference outdoor temperature based on the first duration information 700, the air conditioner 1 may determine the predetermined basic duration as the first duration.

When the outdoor temperature measured by the outdoor temperature measurer 134 is equal to or greater than the first reference outdoor temperature based on the first duration information 700, the air conditioner 1 may set the predetermined basic duration 1 to be shorter than the predetermined basic duration.

For example, in a state in which a set number '3' of the first duration information 700 is set, when the outdoor temperature measured by the outdoor temperature measurer 134 is less than 27° C., the air conditioner 1 may determine 30 minutes as the first duration. When the measure outdoor temperature is equal to or greater than 27° C., the air conditioner 1 may determine one minute as the first duration.

When the indoor temperature measured by the indoor temperature measurer 234 is maintained at the first reference indoor temperature or greater which is set to the reference temperature for a change to cooling mode, for the determined first duration, the air conditioner 1 may change the operation mode of the air conditioner 1 from the heating mode to the cooling mode after the determined first duration.

Accordingly, the air conditioner 1 determines the duration that is shorter than the predetermined basic duration, in a state in which the heat is transferred from the outside to the indoor space due to the increase of the outdoor temperature and the load on the mode change is increased, and thus the air conditioner 1 may quickly change the operation mode to the cooling mode.

That is, the air conditioner 1 may respond to the load on the mode change in advance by determining the duration, which is required to be maintained at the reference temperature of the mode change for the mode change, based on the outdoor temperature, and thus it is possible to maintain the indoor temperature at the set temperature although the outdoor temperature rapidly changes.

Referring to FIG. 8, according to an embodiment, the second duration information 800 may include information on second duration that is required to be maintained at the second reference indoor temperature, which is set to a reference temperature for the mode change, for changing the cooling mode to the heating mode.

The second duration information 800 may include a plurality of set numbers and information about the second duration corresponding to each of the plurality of set numbers.

For example, the second duration information 800 indicates that second duration corresponding to a first set number '1' is 30 minutes. The second duration of the set number '1' is set to 30 minutes regardless of the outdoor temperature that is the outdoor temperature is not considered.

In addition, the second duration information 800 indicates that second duration corresponding to a set number '2' is 1 minute when the outdoor temperature is 0° C. or less and the set number '2' is 30 minutes when the outdoor temperature is greater than 0° C. The outdoor temperature is considered in the second duration of the set number '2', which may vary according to the outdoor temperature.

That is, the second duration information 800 may include information on the predetermined basic duration, information on the second reference outdoor temperature set to a reference temperature for reducing the duration for a change to the heating mode, and information on duration that is shorter than the predetermined basic duration when the outdoor temperature is equal to or less than the second reference outdoor temperature.

As illustrated in FIG. 8, the predetermined basic duration may be 30 minutes, which may vary according to the user's input. The duration that is reduced according to the outdoor temperature may be one minute, which may vary according to the user's input.

The second reference outdoor temperature, which is set to the reference temperature for reducing the duration for a change to the heating mode, may vary according to the set number, and the second reference outdoor temperature of each set number may vary according to the user's input.

In addition, the user can set the set number on the second duration information 800 for determining the second duration through the indoor unit inputter 235, and the air conditioner 1 may determine the second duration information 800 based on the set number.

The second duration information 800 may be stored in the outdoor unit storage 132 and the indoor unit storage 232. Although it is described that the second duration information 800 includes only the set numbers 1 to 4, the disclosure is not limited thereto, and a plurality of set numbers may be contained.

When the outdoor temperature measured by the outdoor temperature measurer 134 exceeds the second reference outdoor temperature based on the second duration information 800, the air conditioner 1 may determine the predetermined basic duration as the second duration.

When the outdoor temperature measured by the outdoor temperature measurer 134 is equal to or less than the second reference outdoor temperature based on the second duration information 800, the air conditioner 1 may set the predetermined basic duration 1 to be shorter than the predetermined basic duration.

For example, in a state in which a set number '3' of the second duration information 800 is set, when the outdoor temperature measured by the outdoor temperature measurer 134 exceeds 5° C., the air conditioner 1 may determine 30 minutes as the second duration. When the measure outdoor temperature is equal to or less than 5° C., the air conditioner 1 may determine one minute as the second duration.

When the indoor temperature measured by the indoor temperature measurer 234 is maintained at the second reference indoor temperature or less which is set to the reference temperature for a change to the heating mode, for the determined second duration, the air conditioner 1 may change the operation mode of the air conditioner 1 from the cooling mode to the heating mode after the determined second duration.

Accordingly, the air conditioner 1 determines the duration that is shorter than the predetermined basic duration in a state in which the heat is transferred from the indoor space to the outdoor space due to the decrease of the outdoor temperature and the load on the mode change is increased, and thus the air conditioner 1 may quickly change the operation mode to the heating mode.

That is, the air conditioner 1 may respond to the load on the mode change in advance by determining the duration, which is required to be maintained at the reference temperature of the mode change for the mode change, based on the outdoor temperature, and thus it is possible to maintain the indoor temperature at the set temperature although the outdoor temperature rapidly changes.

Hereinbefore the air conditioner 1 for performing the mode change by using one reference temperature for reducing the duration in the mode change has been described. Hereinafter the air conditioner 1 performing the mode change by using a lower limit temperature and an upper limit temperature for reducing the duration in the mode change will be described.

Figure 9:
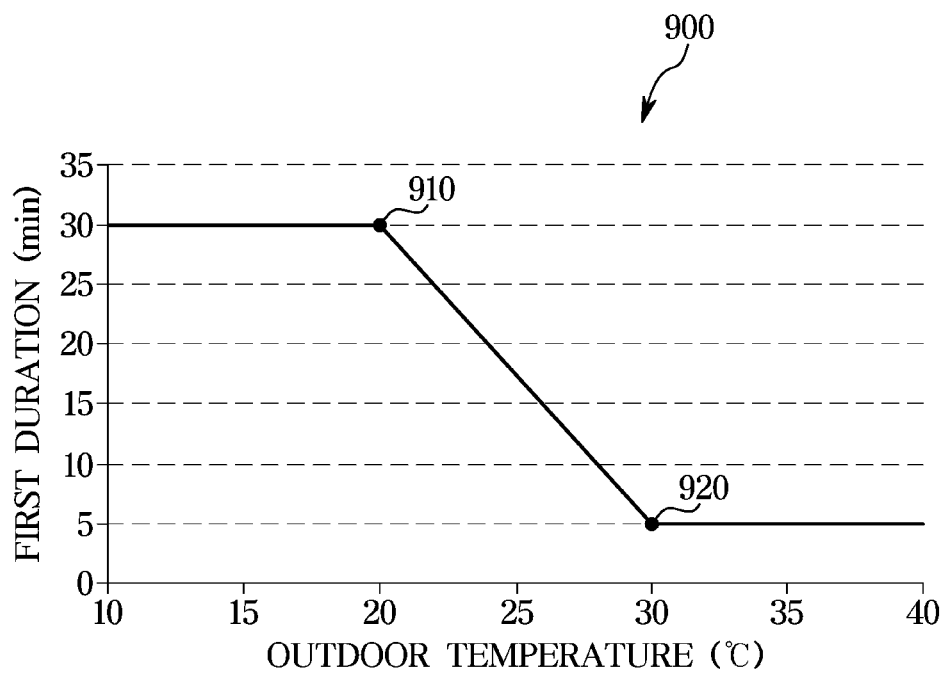
FIG. 9 is a view illustrating third duration information used for changing the heating mode to the cooling mode in the air conditioner according to an embodiment of the disclosure.
Figure 10:
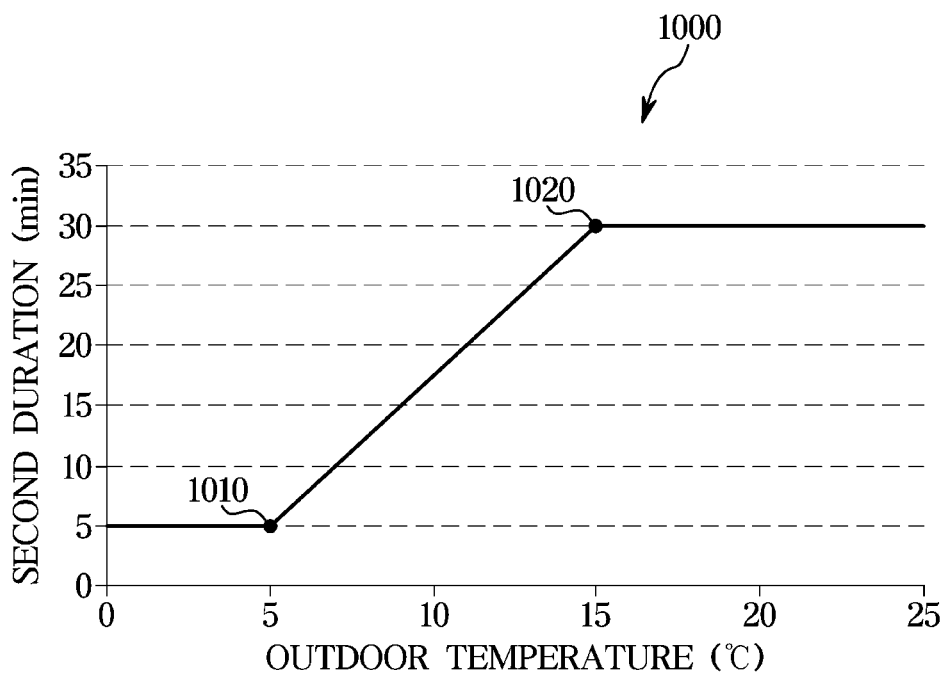
FIG. 10 is a view illustrating fourth duration information used for changing the cooling mode to the heating mode in the air conditioner according to an embodiment of the disclosure.

FIG. 9 is a view illustrating third duration information 900 used for changing the heating mode to the cooling mode in the air conditioner 1 according to an embodiment, and FIG. 10 is a view illustrating fourth duration information 1000 used for changing the cooling mode to the heating mode in the air conditioner 1 according to an embodiment.

Referring to FIG. 9, according to an embodiment, the third duration information 900 may include information on first duration that is required to be maintained at the first reference indoor temperature, which is set to a reference temperature for the mode change, for changing the heating mode to the cooling mode.

The third duration information 900 may include information on a first outdoor lower limit temperature 910 and a first outdoor upper limit temperature which are set to a reference temperature for reducing duration for a change to the cooling mode in the outdoor temperature.

Further, the third duration information 900 may include information on first duration corresponding to each outdoor temperature.

For example, the third duration information 900 may indicate that the first duration is 30 minutes at the first outdoor lower limit temperature 910 or less, and the first duration is 5 minutes at the first outdoor upper limit temperature 920 or greater.

Further, the third duration information 900 may indicate that the first duration is reduced as the outdoor temperature increases from the first outdoor lower limit temperature 910 to the first outdoor upper limit temperature 920. That is, the third duration time information 900 may indicate the first duration in which a period of time, which is reduced from the predetermined basic duration, increases as the outdoor temperature increases from the first outdoor lower limit temperature 910 to the first outdoor upper limit temperature 920.

That is, the third duration information 900 may include information on the predetermined basic duration, information on the first outdoor lower limit temperature 910 and the first outdoor upper limit temperature set to a reference temperature for reducing duration for a change to the cooling mode, and information on a functional relationship between the outdoor temperature and the first duration, indicating that a period of time, which is reduced from the predetermined basic duration, increases as the outdoor temperature increases from the first outdoor lower limit temperature 910 to the first outdoor upper limit temperature 920.

As illustrated in FIG. 9, the predetermined basic duration may be 30 minutes, which may vary according to the user's input. Further, the maximum reduced duration according to the outdoor temperature may be 5 minutes, which may vary according to the user's input.

The first outdoor lower limit temperature 910 and the first outdoor upper limit temperature 920, which are set to the reference temperatures for reducing the duration for a change to the cooling mode, may vary according to the user's input.

The third duration information 900 may be stored in the outdoor unit storage 132 and the indoor unit storage 232. FIG. 9 illustrates that the functional relationship between the outdoor temperature and the first duration of the third duration information 900 is a linear relationship, but is not limited thereto. Any type of function may be used as long as a functional relationship indicating that a period of time, which is reduced from the predetermined basic duration, increases as the outdoor temperature increases from the first outdoor lower limit temperature 910 to the first outdoor upper limit temperature 920.

The air conditioner 1 may set the first outdoor lower limit temperature 910 and the first outdoor upper limit temperature 920 based on the third duration information 900.

When the outdoor temperature measured by the outdoor temperature measurer 134 is equal to or lower than the first outdoor lower limit temperature 910 based on the third duration information 900, the air conditioner 1 may set the predetermined basic duration as the first duration.

Further, when the outdoor temperature measured by the outdoor temperature measurer 134 is greater than the first outdoor upper limit temperature 920 based on the third duration information 900, the air conditioner 1 may set the predetermined basic duration to be maximally reduced from the predetermined basic duration.

In addition, based on the third duration information 900, the air conditioner 1 may determine the first duration so that a period of time, which is reduced from the predetermined basic duration, increases according to the functional relationship between the outdoor temperature and the first duration, as the outdoor temperature measured by the outdoor temperature measurer 134 increases from the first outdoor lower limit temperature 910 to the first outdoor upper limit temperature 920.

For example, the air conditioner 1 may determine the predetermined basic duration 30 minutes as the first duration when the measured outdoor temperature 18° C. is lower than 20° C. corresponding to the first outdoor lower limit temperature 910.

Further, the air conditioner 1 may determine 5 minutes, which is maximally reduced from the predetermined basic duration, as the first duration when the measured outdoor temperature 32° C. is greater than 30° C. corresponding to the first outdoor upper limit temperature 920.

In addition, the air conditioner 1 may determine 17.5 minutes as the first duration according to the functional relationship between the outdoor temperature and the first duration when the measured outdoor temperature 25° C. is between 20° C. corresponding to the first outdoor lower limit temperature 910 and 30° C. corresponding to the first outdoor upper limit temperature 920.

When the indoor temperature measured by the indoor temperature measurer 234 is maintained at the first reference indoor temperature or greater, which is set to the reference temperature for a change to the cooling mode, for the determined first duration, the air conditioner 1 may change the operation mode from the heating mode to the cooling mode after the determined first duration.

Referring to FIG. 10, according to an embodiment, the fourth duration information 1000 may include information on second duration that is required to be maintained at the second reference indoor temperature, which is set to a reference temperature for the mode change, for changing the cooling mode to the heating mode.

The fourth duration information 1000 may include information on a second outdoor lower limit temperature 1010 and a second outdoor upper limit temperature 1020 set to a reference temperature for reducing duration for a change to the heating mode in the outdoor temperature.

Further, the fourth duration information 1000 may include information on second duration corresponding to each outdoor temperature.

For example, the fourth duration information 1000 may indicate that the second duration is 30 minutes at the second outdoor upper limit temperature 1020 or greater and the second duration is 5 minutes at the second outdoor lower limit temperature 1010 or less.

Further, the fourth duration information 1000 may indicate that the second duration is reduced as the outdoor temperature decreases from the second outdoor upper limit temperature 1020 to the second outdoor lower limit temperature 1010. That is, the fourth duration information 1000 may indicate the second duration in which a period of time, which is reduced from the predetermined basic duration, increases as the outdoor temperature decreases from the second outdoor upper limit temperature 1020 to the second outdoor lower limit temperature 1010.

That is, the fourth duration information 1000 may include information on the predetermined basic duration, information on the second outdoor lower limit temperature 1010 and the second outdoor upper limit temperature 1020 set to a reference temperature for reducing duration for a change to the heating mode, and information on a functional relationship between the outdoor temperature and the second duration indicating that a period of time, which is reduced from the predetermined basic duration, increases as the outdoor temperature decreases from the second outdoor upper limit temperature 1020 to the second outdoor lower limit temperature 1010.

As illustrated in FIG. 10, the predetermined basic duration may be 30 minutes, which may vary according to the user's input. Further, the maximum reduced duration according to the outdoor temperature may be 5 minutes, which may vary according to the user's input.

The second outdoor lower limit temperature 1010 and the second outdoor upper limit temperature 1020, which are set to the reference temperatures for reducing the duration for a change to the heating mode, may vary according to the user's input.

The fourth duration information 1000 may be stored in the outdoor unit storage 132 and the indoor unit storage 232. FIG. 10 illustrates that the functional relationship between the outdoor temperature and the second duration of the fourth duration information 1000 is a linear relationship, but is not limited thereto. Any type of function may be used as long as a functional relationship indicating that a period of time, which is reduced from the predetermined basic duration, increases as the outdoor temperature decreases from the second outdoor upper limit temperature 1020 to the second outdoor lower limit temperature 1010.

The air conditioner 1 may set the second outdoor lower limit temperature 1010 and the second outdoor upper limit temperature 1020 based on the fourth duration information 1000.

When the outdoor temperature measured by the outdoor temperature measurer 134 is equal to or greater than the second outdoor upper limit temperature 1020 based on the fourth duration information 1000, the air conditioner 1 may set the predetermined basic duration as the second duration.

Further, when the outdoor temperature measured by the outdoor temperature measurer 134 is equal to or less than the second outdoor lower limit temperature 1010 based on the fourth duration information 1000, the air conditioner 1 may set the predetermined basic duration to be maximally reduced from the predetermined basic duration.

In addition, based on the fourth duration information 1000, the air conditioner 1 may determine the second duration so that a period of time, which is reduced from the predetermined basic duration, increases according to the functional relationship between the outdoor temperature and the second duration, as the outdoor temperature measured by the outdoor temperature measurer 134, decreases from the second outdoor upper limit temperature 1020 to the second outdoor lower limit temperature 1010.

For example, the air conditioner 1 may determine the predetermined basic duration 30 minutes as the second duration when the measured outdoor temperature 18° C. is greater than 15° C. corresponding to the second outdoor upper limit temperature 1020.

Further, the air conditioner 1 may determine 5 minutes, which is maximally reduced from the predetermined basic duration, as the second duration when the measured outdoor temperature 3° C. is lower than 5° C. corresponding to the second outdoor lower limit temperature 1010.

In addition, the air conditioner 1 may determine 17.5 minutes as the second duration according to the functional relationship between the outdoor temperature and the second duration when the measured outdoor temperature 10° C. is between 5° C. corresponding to the second outdoor lower limit temperature 1010 and 15° C. corresponding to the second outdoor upper limit temperature 1020.

When the indoor temperature measured by the indoor temperature measurer 234 is maintained at the second reference indoor temperature or greater, which is set to the reference temperature for a change to the heating mode, for the determined second duration, the air conditioner 1 may change the operation mode from the cooling mode to the heating mode after the determined second duration.

Hereinbefore the air conditioner 1 provided with one indoor unit 100 and configured to change the operation mode based on the indoor temperature and the outdoor temperature has been described. Hereafter a multi air conditioner system 10 provided with a plurality of indoor units and configured to change the operation mode based on the indoor temperature and the outdoor temperature will be described.

Figure 11:
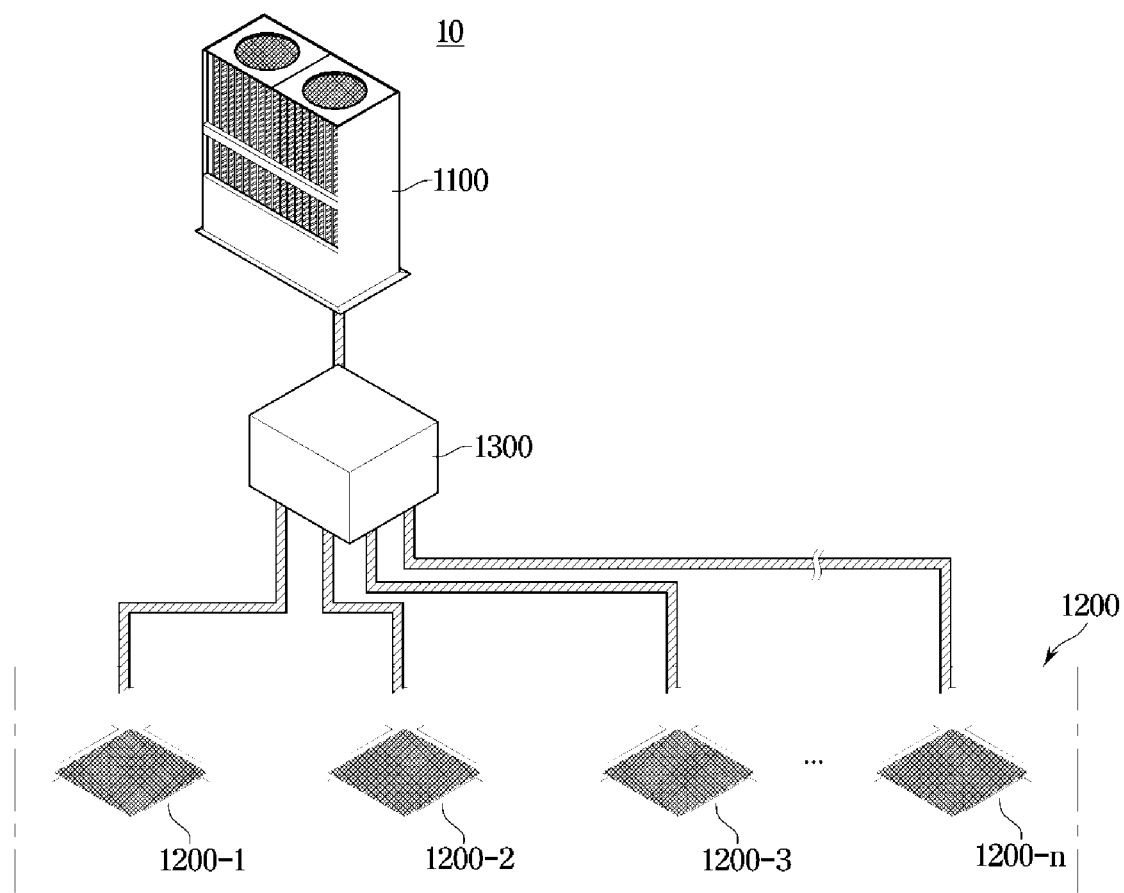
FIG. 11 is a view illustrating an appearance of a multi air conditioner system according to an embodiment of the disclosure.

FIG. 11 is a view illustrating an appearance of a multi air conditioner system 10 according to an embodiment.

Referring to FIG. 11, the multi air conditioner system 10 includes an outdoor unit 1100 located in the outdoor space and configured to perform heat exchange between a refrigerant and outdoor air, a plurality of indoor units 1200: 1200-1, 1200-2, 1200-3, . . . , 1200-*n* located in the indoor space and configured to perform heat exchange between a refrigerant and indoor air, and a distributor 1300 configured to distribute the refrigerant supplied from the outdoor unit 1100 to each of the indoor units 1200-1, 1200-2, 1200-3, . . . , and 1200-*n* according to the operation mode of each of the indoor units 1200-1, 1200-2, 1200-3, . . . , and 1200-*n*. FIG. 11 illustrates that the multi air conditioner system 10 includes a single outdoor unit 110, but is not limited thereto, and thus the multi air conditioner system 10 may include two outdoor units or more.

For ease of understanding, a signal flow of the multi air conditioner system 10 and a refrigerant flow of the multi air conditioner system 10 will be individually described and thus the refrigerant flow of the multi air conditioner system 10 will be described first, and the signal flow of the multi air conditioner system 10 will be described later.

Figure 12:
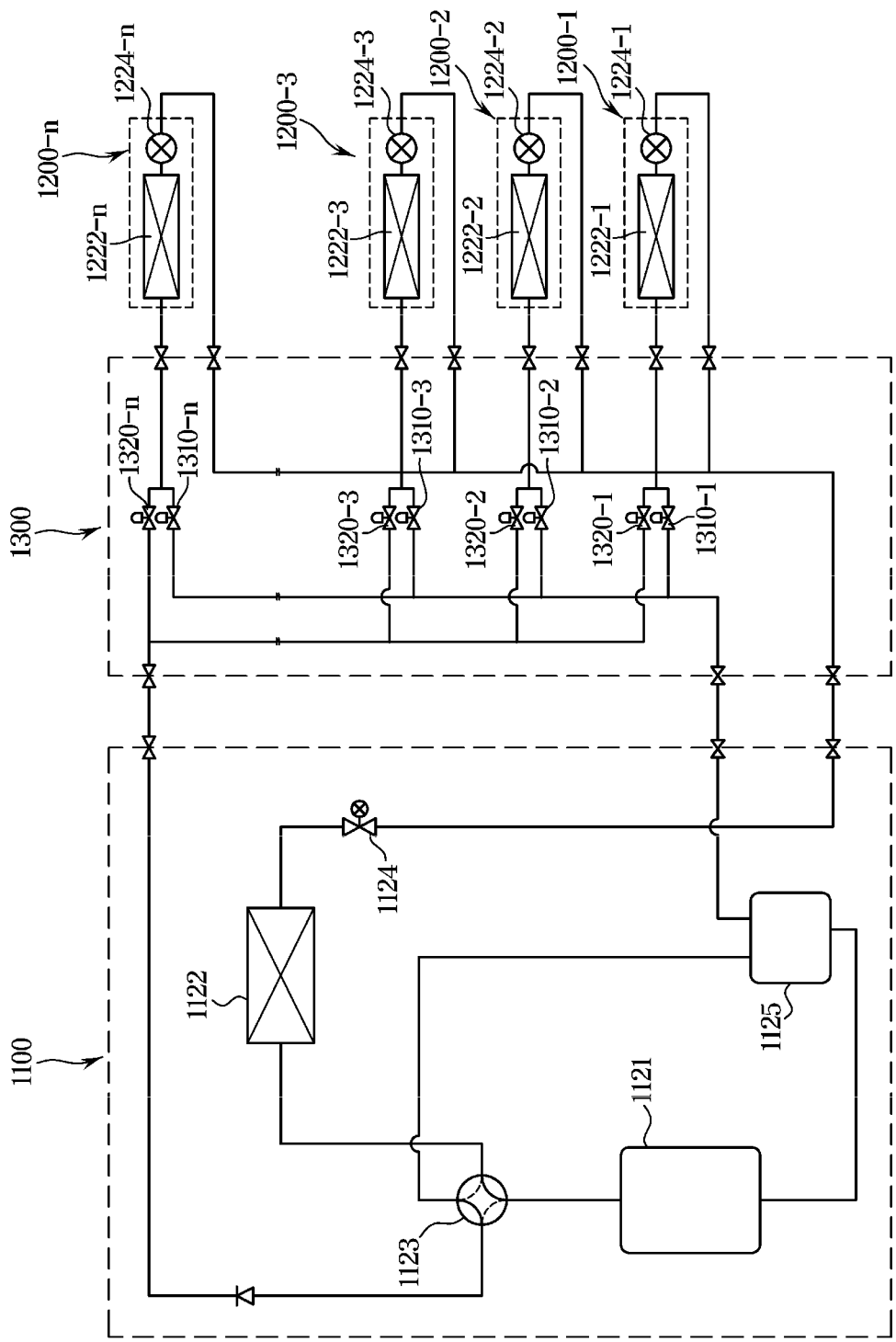
FIG. 12 is a view illustrating a configuration related to a flow of a refrigerant in the multi air conditioner system according to an embodiment of the disclosure.

FIG. 12 is a view illustrating a configuration related to a flow of a refrigerant in the multi air conditioner system 10 according to an embodiment.

Referring to FIG. 12, the multi air conditioner system 10 includes the outdoor unit 1100, the indoor unit 1200, and the distributor 1300 related to the flow of the refrigerant.

The outdoor unit 1100 includes a compressor 1121 compressing the refrigerant, an outdoor heat exchanger 1122 performing heat exchange between the outdoor air and the refrigerant, a four-way valve 1123 selectively guiding the refrigerant, which is compressed by the compressor 1121, to either the outdoor heat exchanger 1122 or the indoor unit 1200 according to a mode such as a heating mode or a cooling mode of each of the indoor unit 1200, an outdoor expansion valve 1124 decompressing the refrigerant guided to the outdoor heat exchanger 1122 in the heating mode, and an accumulator 1125 preventing a liquid refrigerant from flowing to the compressor 1121.

Each of the indoor units 1200-1, 1200-2, 1200-3, . . . , and 1200-*n* includes indoor heat exchangers 1222: 1222-1, 1222-2, 1222-3, . . . , and 1222-*n* performing heat exchange between indoor air and a refrigerant, and indoor expansion valves 1224: 1224-1, 1224-2, 1224-3, . . . , 1224-*n* decompressing the refrigerant supplied to the indoor heat exchanger 1222 during cooling.

The distributor 1300 may include a refrigerant pipe arranged between the outdoor unit 1100 and the indoor unit 1200 and configured to guide the refrigerant supplied from the outdoor unit 1100 to the indoor unit 1200, and a cooling valve 1310: 1310-1, 1310-2, 1310-3, . . . , and 1310-*n* and a heating valve 1320: 1320-1, 1320-2, 1320-3, . . . and 1320-*n* configured to control the flow of the refrigerant according to the operation mode such as the cooling mode or the heating mode of each of indoor units 1200-1, 1200-2, 1200-3, . . . , and 1200-*n*.

The cooling valve 1310-1, 1310-2, 1310-3, . . . , and 1310-*n* is installed in such a way that an inlet side thereof is connected to the indoor heat exchangers 1222-1, 1222-2, 1222-3, . . . , and 1222-*n* of the indoor units 1200-1, 1200-2, 1200-3, . . . , and 1200-*n*, respectively, and an outlet side thereof is joined to each other and connected to the outdoor unit 110. Therefore, the cooling valve 1310: 1310-1, 1310-2, 1310-3, . . . , and 1310-*n* may be opened to allow the direction of the refrigerant flowing in each of the indoor units 1200-1, 1200-2, 1200-3, . . . , and 1200-*n* to be switched to perform the cooling mode that is set on each of the indoor units 1200-1, 1200-2, 1200-3, . . . , and 1200-*n*.

The heating valve 1320-1, 1320-2, 1320-3, . . . and 1320-*n* is installed in such a way that an inlet side thereof is joined to each other and then connected to the outdoor unit 110 and an outlet side thereof is connected to the indoor heat exchangers 1222-1, 1222-2, 1222-3, . . . , and 1222-*n* of the indoor units 1200-1, 1200-2, 1200-3, . . . , and 1200-*n*, respectively. Therefore, the heating valve 1320-1, 1320-2, 1320-3, . . . and 1320-*n* may be opened to allow the direction of the refrigerant flowing in each of the indoor units 1200-1, 1200-2, 1200-3, . . . , and 1200-*n* to be switched to perform the heating mode that is set on each of the indoor units 1200-1, 1200-2, 1200-3, . . . , and 1200-*n*.

As described above, the multi air conditioner system 10 may switch the flow of the refrigerant flowing in each of the indoor units 1200-1, 1200-2, 1200-3, . . . , and 1200-*n*, according to the cooling mode or the heating mode by controlling the cooling valve 1310-1, 1310-2, 1310-3, . . . , and 1310-*n* and the heating valve 1320-1, 1320-2, 1320-3, . . . and 1320-*n* of the distributor 1300 according to the operation mode of the indoor units 1200-1, 1200-2, 1200-3, . . . , and 1200-*n*.

As for the refrigerant cycle, when the indoor unit 1200 is in the cooling mode, the refrigerant is compressed to a high pressure by the compressor 1121 of the outdoor unit 1100, and the compressed refrigerant is guided to the outdoor heat exchanger 1122 though the four-way valve 1123. The compressed refrigerant is condensed in the outdoor heat exchanger 1122, and during condensation, the refrigerant releases latent heat to the outdoor air. The condensed refrigerant is guided to the indoor unit 1200 via the distributor 1300.

The refrigerant guided to the indoor unit 1200 is decompressed by the indoor expansion valve 1224 provided in the indoor unit 1200, and then evaporated in the indoor heat exchanger 1222. During evaporation, the refrigerant absorbs latent heat from the indoor air. In the cooling mode, the multi air conditioner system 10 may cool the indoor air using the heat exchange between the refrigerant generated in the indoor heat exchanger 1222 and the indoor air.

The evaporated refrigerant is guided to the outdoor unit 1100 through the cooling valve 1310 provided in the distributor 1300. The refrigerant in the accumulator 1125 is separated into the liquid refrigerant that is not evaporated and the evaporated gaseous refrigerant and then the gaseous refrigerant is supplied to the compressor 1121. The refrigerant guided to the compressor 1121 is compressed and supplied to the four-way valve 1123, thereby repeating the above-described refrigerant cycle.

In summary, in the cooling mode, the multi air conditioner system 10 absorbs the thermal energy of indoor air in the indoor unit 1200, and releases the thermal energy to the outdoor space in the outdoor unit 1100, thereby discharging the indoor thermal energy to the outside.

When the indoor unit 1200 is in the heating mode, the refrigerant is compressed to a high pressure by the compressor 1121 of the outdoor unit 1100, and the compressed refrigerant is guided to the distributor 1300 though the four-way valve 1123. The compressed refrigerant is guided to the indoor unit 1200 via the heating valve 1320 of the distributor 1300.

The refrigerant is condensed in the indoor heat exchanger 1222 provided in the indoor unit 1200. During condensation, the refrigerant releases latent heat into the indoor air. In the heating mode, the multi air conditioner system 10 may heat the indoor air using the heat exchange between the refrigerant generated in the indoor heat exchanger 1222 and the indoor air. The condensed refrigerant is decompressed in the indoor expansion valve 1224, and then guided to the outdoor unit 1100 through the distributor 1300.

The refrigerant guided to the outdoor unit 1100 is decompressed by the outdoor expansion valve 1124 provided in the outdoor unit 1100 and then evaporated in the outdoor heat exchanger 1124. In the accumulator 1125, the evaporated refrigerant is separated into a liquid refrigerant, which is not evaporated and an evaporated gaseous refrigerant, and then the gaseous refrigerant is supplied to the compressor 1121. The refrigerant guided to the compressor 1121 is compressed and supplied to the four-way valve 1123, thereby repeating the above-described refrigerant cycle.

In summary, in the heating mode, the multi air conditioner system 10 absorbs the thermal energy of the outdoor air in the outdoor unit 1100, and discharges the thermal energy to the indoor space in the indoor unit 1200, thereby transferring the outdoor thermal energy to the indoor space.

Hereinafter the flow of signal between the components contained in the multi air conditioner system 10 will be described.

Figure 13:
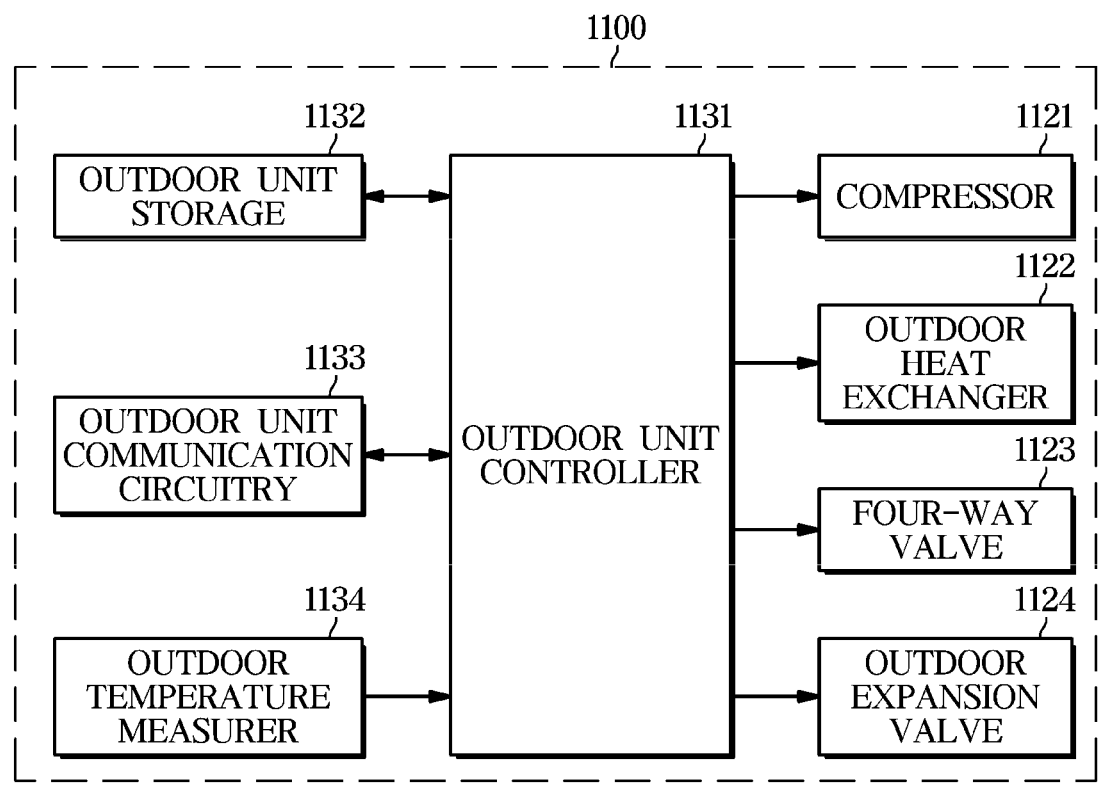
FIG. 13 is a block diagram illustrating a control signal flow of an outdoor unit contained in the multi air conditioner system according to an embodiment of the disclosure.

FIG. 13 is a block diagram illustrating a control signal flow of an outdoor unit 1100 contained in the multi air conditioner system 10 according to an embodiment.

Referring to FIG. 13, the outdoor unit 1100 includes an outdoor unit controller 1131 configured to control the compressor 1121, the outdoor heat exchanger 1122, the four-way valve 1123 and the outdoor expansion valve 1124, which are contained in the outdoor unit 1100, according to the operation mode of each of the indoor units 1200-1, 1200-2, 1200-3, . . . , and 1200-*n*, and configured to change an operation mode of each of the indoor units 1200-1, 1200-2, 1200-3, . . . , and 1200-*n* based on the outdoor temperature and the indoor temperature, an outdoor unit storage 1132 configured to store programs and data related to the operation of the outdoor unit 1100 and programs and data related to the operation mode change of each of the indoor units 1200-1, 1200-2, 1200-3, . . . , and 1200-*n*, an outdoor unit communication circuitry 1133 configured to communicate with the indoor unit 1200 and the distributor 1300, and an outdoor temperature measure 1134 configured to measure an outdoor temperature.

The controller 1131, the outdoor unit storage 1132, the outdoor communication circuitry 1133, the outdoor temperature measurer 1134, the compressor 1121, the outdoor heat exchanger 1122, the four-way valve 1123 and the outdoor expansion valve 1124, which are illustrated in FIG. 13 may be basically the same as the outdoor unit controller 131, the outdoor unit storage 132, the outdoor unit communication circuitry 133, the outdoor temperature measurer 134, the compressor 121, the outdoor heat exchanger 122, the four-way valve 123 and the outdoor expansion valve 124, which are illustrated in FIG. 3. Therefore, a description of the same parts as those shown in FIG. 3 will be omitted and the description will be described with respect to the outdoor unit controller 1131 and the outdoor unit communication circuitry 1133 which have an additional component.

The outdoor unit controller 1131 controls the operation of each configuration contained in the outdoor unit 1100. For example, when a request for cooling is received from the third indoor unit 1200-3 through the outdoor unit communication circuitry 1133, the outdoor unit controller 1131 controls the outdoor unit communication circuitry 1133 to transmit a cooling request reception signal to the third indoor unit 1200-3, controls the compressor 1121 to be operated, and controls the outdoor unit communication circuitry 1133 to transmit a signal for requesting to open the third cooling valve 1310-3 (refer to FIG. 12) to the distributor 1300.

As mentioned above, the outdoor unit controller 1131 controls the flow of the refrigerant flowing in each of the indoor units 1200-1, 1200-2, 1200-3, . . . , and 1200-n according to the operation mode of each of the indoor units 1200-1, 1200-2, 1200-3, . . . , and 1200-n, and thus each of the indoor units 1200-1, 1200-2, 1200-3, . . . , and 1200-n may be operated in the cooling mode or the heating mode.

The outdoor unit controller 1131 may change the operation mode of each of the indoor units 1200-1, 1200-2, 1200-3, . . . , and 1200-n based on the outdoor temperature and the indoor temperature of the indoor space, in which each of the indoor units 1200-1, 1200-2, 1200-3, . . . , and 1200-n is placed, that is measured in each of the indoor units 1200-1, 1200-2, 1200-3, . . . , and 1200-n.

Particularly, the outdoor unit controller 1131 may determine duration corresponding to the outdoor temperature measured by the outdoor temperature measurer 1134.

At this time, the outdoor unit controller 1131 may determine duration corresponding to the measured outdoor temperature based on the first duration information 700 to the fourth duration information 1000 stored in the outdoor unit storage 1132.

In addition, the outdoor unit controller 1131 may perform the mode change of each of the indoor units 1200-1, 1200-2, 1200-3, . . . , and 1200-n based on whether or not the indoor temperature of the indoor space, in which each of the indoor units 1200-1, 1200-2, 1200-3, . . . , and 1200-n is placed, is maintained at the reference temperature for the mode change, for the determined duration.

That is, based on the first duration information 700 and the set number, the outdoor unit controller 1131 may determine the first duration to be shorter than the predetermined basic duration when the measured outdoor temperature is equal to or greater than the first reference outdoor temperature that is set to the reference temperature to reduce the duration for a change to the cooling mode, and the outdoor unit controller 1131 may determine the predetermined basic duration as the first duration when the measured outdoor temperature is less than the first reference outdoor temperature.

Further, the outdoor unit controller 1131 may set the first outdoor lower limit temperature 910 and the first outdoor upper limit temperature 920 as the reference temperature to reduce the duration for a change to the cooling mode, based on the third duration information 900, and determine the first duration to allow a period of time, which is reduced from the predetermined basic duration, to increase as the measured outdoor temperature increases from the first outdoor lower limit temperature 910 to the first outdoor upper limit temperature 920.

When the indoor unit 1200 performs the heating operation according to the heating mode and when the indoor temperature, which is measured in the indoor space in which the indoor unit 1200 is placed, is maintained at the first reference indoor temperature or greater that is set to the reference temperature for a change to the cooling mode, for the determined first duration, the outdoor unit controller 1131 may change the mode of the indoor unit 1200 from the heating mode to the cooling mode after the determined first duration.

At this time, the outdoor unit controller 1131 may control the outdoor unit communication circuitry 1133 to transmit a signal for requesting to open the cooling valve 1310 to the distributor 1300 for the cooling mode of the indoor unit 1200.

For example, when the third indoor unit 1200-3 performs the heating operation according to the heating mode and when the indoor temperature, which is measured in the indoor space in which the third indoor unit 1200-3 is placed, is maintained at the first reference indoor temperature or greater for the determined first duration, the outdoor unit controller 1131 may change the mode of the third indoor unit 1200-3 from the heating mode to the cooling mode after the determined first duration. Further, the outdoor unit controller 1131 may control the outdoor unit communication circuitry 1133 to transmit a signal for requesting to open the third cooling valve 1310-3 to the distributor 1300 for the cooling mode of the third indoor unit 1200-3.

Further, based on the second duration information 800 and the set number, the outdoor unit controller 1131 may determine the second duration to be shorter than the predetermined basic duration when the measured outdoor temperature is equal to or less than the second reference outdoor temperature that is set to the reference temperature to reduce the duration for a change to the heating mode, and the outdoor unit controller 1131 may determine the predetermined basic duration as the second duration when the measured outdoor temperature exceeds the second reference outdoor temperature.

Further, the outdoor unit controller 1131 may set the second outdoor lower limit temperature 1010 and the second outdoor upper limit temperature 1020 as the reference temperature to reduce the duration for a change to the heating mode, based on the fourth duration information 1000, and determine the second duration to allow a period of time, which is reduced from the predetermined basic duration, to increase as the measured outdoor temperature decreases from the second outdoor upper limit temperature 1020 to the second outdoor lower limit temperature 1010.

When the indoor unit 1200 performs the cooling operation according to the cooling mode and when the indoor temperature, which is measured in the indoor space in which the indoor unit 1200 is placed, is maintained at the second reference indoor temperature or less that is set to the reference temperature for a change to the heating mode, for the determined second duration, the outdoor unit controller 1131 may change the mode of the indoor unit 1200 from the cooling mode to the heating mode after the determined second duration.

At this time, the outdoor unit controller 1131 may control the outdoor unit communication circuitry 1133 to transmit a signal for requesting to open the heating valve 1320 to the distributor 1300 for the heating mode of the indoor unit 1200.

For example, when the third indoor unit 1200-3 performs the cooling operation according to the cooling mode and when the indoor temperature, which is measured in the indoor space in which the third indoor unit 1200-3 is placed, is maintained at the second reference indoor temperature or less for the determined second duration, the outdoor unit controller 1131 may change the mode of the third indoor unit 1200-3 from the cooling mode to the heating mode after the determined second duration. Further, the outdoor unit controller 1131 may control the outdoor unit communication circuitry 1133 to transmit a signal for requesting to open the third heating valve 1320-3 to the distributor 1300 for the heating mode of the third indoor unit 1200-3.

Figure 14:
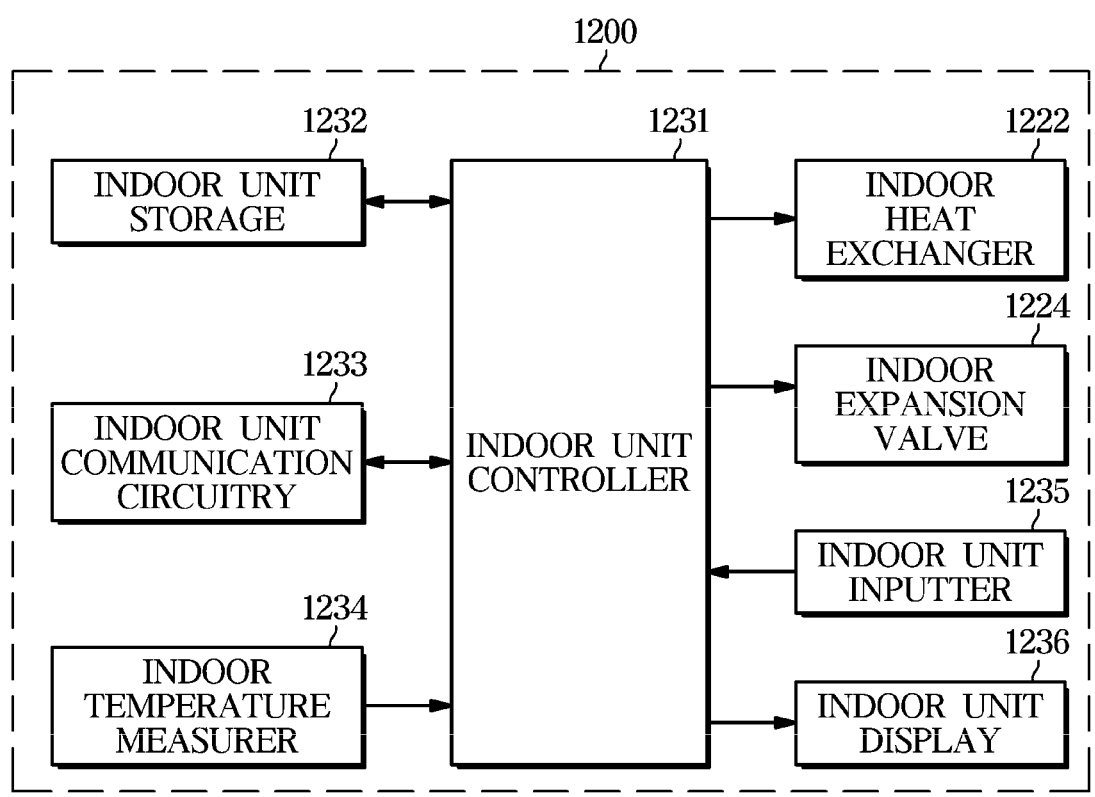
FIG. 14 is a block diagram illustrating a control signal flow of an indoor unit contained in the multi air conditioner system according to an embodiment of the disclosure.

FIG. 14 is a block diagram illustrating a control signal flow of an indoor unit 1200 contained in the multi air conditioner system 10 according to an embodiment.

Referring to FIG. 14, the indoor unit 1200 includes an indoor unit controller 1231 configured to control the door heat exchanger 1222, and the indoor expansion valve 1224, which are contained in the indoor unit 1200, according to the cooling mode or the heating mode, and configured to change an operation mode of the indoor unit 1200 based on the outdoor temperature and the indoor temperature, an indoor unit storage 1232 configured to store programs and data related to the operation of the indoor unit 1200 and programs and data related to the operation mode change of the indoor unit 1200, an indoor unit communication circuitry 1233 configured to communicate with the outdoor unit 1100, other indoor unit, and the distributor 1300, an indoor temperature measure 1234 configured to measure an indoor temperature of the indoor space in which the indoor unit 1200 is placed, the indoor unit inputter 1235 configured to receive an operation command about the indoor unit 1200 from a user, and an indoor display 1236 configured to display operation information of the indoor unit 1200.

The indoor unit controller 1231, the indoor unit storage 1232, the indoor communication circuitry 1233, the indoor temperature measure 1234, the indoor unit inputter 1235, the indoor display 1236, the indoor heat exchanger 1222 and the indoor expansion valve 1224, which are illustrated in FIG. 14 may be basically the same as the indoor unit controller 231, the indoor unit storage 232, the indoor communication circuitry 233, the indoor temperature measure 234, the indoor unit inputter 235, the indoor display 236, the indoor heat exchanger 222 and the indoor expansion valve 224, which are illustrated in FIG. 4. Therefore, a description of the same parts as those shown in FIG. 4 will be omitted and the description will be described with respect to the indoor unit controller 1231 and the indoor unit communication circuitry 1233 which have an additional component.

According to an embodiment, the indoor unit controller 1231 may control the components contained in the indoor unit 1200 according to the cooling mode or the heating mode.

Particularly, when the indoor unit 1200 is in the cooling mode, the indoor unit controller 1231 may control the indoor expansion valve 1224 to decompress the liquid refrigerant supplied from the outdoor unit 1100, and control the indoor heat exchanger 1222 to evaporate the decompressed liquid refrigerant.

When the indoor unit 1200 is in the heating mode, the indoor unit controller 1231 may control the indoor heat exchanger 1222 to condense the compressed refrigerant supplied from the outdoor unit 1100.

Accordingly, the indoor unit controller 1231-1, 1231-2, 1231-3, . . . , 1231-*n* of the indoor units 1200-1, 1200-2, 1200-3, . . . , and 1200-*n* may control the flow of the refrigerant flowing in each of the indoor units 1200-1, 1200-2, 1200-3, . . . , and 1200-*n* according to the operation mode of each of the indoor units 1200-1, 1200-2, 1200-3, . . . , and 1200-*n*, and thus each of the indoor units 1200-1, 1200-2, 1200-3, . . . , and 1200-*n* may be operated in the cooling mode or the heating mode.

In the same manner as the outdoor unit controller 1131, the indoor unit controller 1231 according to an embodiment may change the operation mode of the indoor unit 1200 based on the outdoor temperature and the indoor temperature.

Particularly, the indoor unit controller 1231-1, 1231-2, 1231-3, . . . , 1231-*n* of the indoor units 1200-1, 1200-2, 1200-3, . . . , and 1200-*n* may change the operation mode of each of the indoor units 1200-1, 1200-2, 1200-3, . . . , and 1200-*n* based on the outdoor temperature and the indoor temperature of the indoor space in which each of the indoor units 1200-1, 1200-2, 1200-3, . . . , and 1200-*n* is placed, which is measured by each of the indoor units 1200-1, 1200-2, 1200-3, . . . , and 1200-*n*.

Particularly, the indoor unit controller 1231 may determine duration corresponding to the outdoor temperature measured by the outdoor temperature measurer 1134.

In this time, the indoor unit controller 1231 may determine duration corresponding to a measured indoor temperature based on the first to fourth duration information 700 to 1000 stored in the indoor unit storage 1232.

In addition, the indoor unit controller 1231-1, 1231-2, 1231-3, . . . , 1231-*n* of each of the indoor units 1200-1, 1200-2, 1200-3, . . . , and 1200-*n* may perform the mode change of each of the indoor units 1200-1, 1200-2, 1200-3, . . . , and 1200-*n* based on whether or not the indoor temperature of the indoor space, in which each of the indoor units 1200-1, 1200-2, 1200-3, . . . , and 1200-*n* is placed, is maintained at the reference temperature for the mode change, for the determined duration.

That is, based on the first duration information 700 and the set number, the indoor unit controller 1231 may determine the first duration to be shorter than the predetermined basic duration when the measured outdoor temperature is equal to or greater than the first reference outdoor temperature that is set to the reference temperature to reduce the duration for a change to the cooling mode, and the indoor unit controller 1231 may determine the predetermined basic duration as the first duration when the measured outdoor temperature is less than the first reference outdoor temperature.

Further, the indoor unit controller 1231 may set the first outdoor lower limit temperature 910 and the first outdoor upper limit temperature 920 as the reference temperature to reduce the duration for a change to the cooling mode, based on the third duration information 900, and determine the first duration to allow a period of time, which is reduced from the predetermined basic duration, to increase as the measured outdoor temperature increases from the first outdoor lower limit temperature 910 to the first outdoor upper limit temperature 920.

When the indoor unit 1200 performs the heating operation according to the heating mode and when the indoor temperature, which is measured in the indoor space in which the indoor unit 1200 is placed, is maintained at the first reference indoor temperature or greater that is set to the reference temperature for a change to the cooling mode, for the determined first duration, the indoor unit controller 1231 may change the mode of the indoor unit 1200 from the heating mode to the cooling mode after the determined first duration.

At this time, the indoor unit controller 1231 may control the indoor unit communication circuitry 1233 to transmit a signal for requesting to open the cooling valve 1310 to the distributor 1300 for the cooling mode of the indoor unit 1200.

For example, when the third indoor unit 1200-3 performs the heating operation according to the heating mode and when the indoor temperature, which is measured in the indoor space in which the third indoor unit 1200-3 is placed, is maintained at the first reference indoor temperature or greater for the determined first duration, the indoor unit controller 1231 may change the mode of the third indoor unit 1200-3 from the heating mode to the cooling mode after the determined first duration. Further, the third indoor unit controller 1231-3 may control the third indoor unit communication circuitry 1233-3 to transmit a signal for requesting to open the third cooling valve 1310-3 to the distributor 1300 for the cooling mode of the third indoor unit 1200-3.

Further, based on the second duration information 800 and the set number, the indoor unit controller 1231 may determine the second duration to be shorter than the predetermined basic duration when the measured outdoor temperature is equal to or less than the second reference outdoor temperature that is set to the reference temperature to reduce the duration for a change to the heating mode, and the indoor unit controller 1231 may determine the predetermined basic duration as the second duration when the measured outdoor temperature exceeds the second reference outdoor temperature.

Further, the indoor unit controller 1231 may set the second outdoor lower limit temperature 1010 and the second outdoor upper limit temperature 1020 as the reference temperature to reduce the duration for a change to the heating mode, based on the fourth duration information 1000, and determine the second duration to allow a period of time, which is reduced from the predetermined basic duration, to increase as the measured outdoor temperature decreases from the second outdoor upper limit temperature 1020 to the second outdoor lower limit temperature 1010.

When the indoor unit 1200 performs the cooling operation according to the cooling mode and when the indoor temperature, which is measured in the indoor space in which the indoor unit 1200 is placed, is maintained at the second reference indoor temperature or less that is set to the reference temperature for a change to the heating mode, for the determined second duration, the indoor unit controller 1231 may change the mode of the indoor unit 1200 from the cooling mode to the heating mode after the determined second duration.

At this time, the indoor unit controller 1231 may control the indoor unit communication circuitry 1233 to transmit a signal for requesting to open the heating valve 1320 to the distributor 1300 for the heating mode of the indoor unit 1200.

For example, when the third indoor unit 1200-3 performs the cooling operation according to the cooling mode and when the indoor temperature, which is measured in the indoor space in which the third indoor unit 1200-3 is placed, is maintained at the second reference indoor temperature or less for the determined second duration, the third indoor unit controller 1231-3 may change the mode of the third indoor unit 1200-3 from the cooling mode to the heating mode after the determined second duration. Further, the third indoor unit controller 1231-3 may control the third indoor unit communication circuitry 1233-3 to transmit a signal for requesting to open the third heating valve 1320-3 to the distributor 1300 for the heating mode of the third indoor unit 1200-3.

Figure 15:
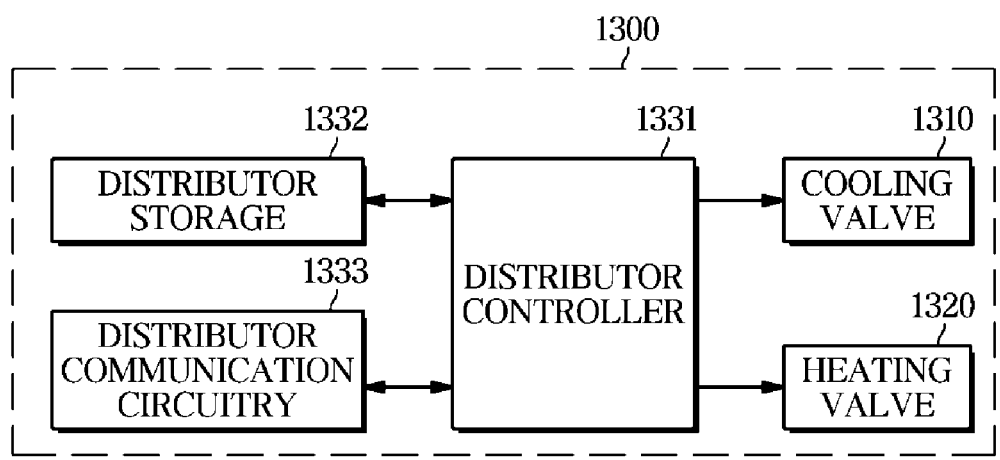
FIG. 15 is a block diagram illustrating a control signal flow of a distributor contained in the multi air conditioner system according to an embodiment of the disclosure.

FIG. 15 is a block diagram illustrating a control signal flow of a distributor 1300 contained in the multi air conditioner system 10 according to an embodiment.

Referring to FIG. 15, the distributor 1300 includes a distributor controller 1331 configured to drive the cooling valve 1310 and the heating valve 1320, which are contained in the distributor 1300, according to the operation mode of the indoor unit 1200, a distributor storage 1332 configured to store programs and data related to the operation of the distributor 1300, and a distributor communication circuitry 1333 configured to communicate with the outdoor unit 1100 and the indoor unit 1200.

To store programs and data related to the operation of the distributor 1300, the distributor storage 1332 may be implemented by at least one of a non-volatile memory such as a cache, a read only memory (ROM), a programmable ROM (PROM), an erasable programmable ROM (EPROM), and a flash memory, a volatile memory such as a Random Access memory (RAM) or a storage medium such as hard disk drive (HDD) and CD-ROM, but is not limited thereto.

According to an embodiment, the distributor communication circuitry 1333 may communicate with the outdoor unit 1100 and the indoor unit 1200. Particularly, the distributor communication circuitry 1333 may exchange information with the outdoor unit communication circuitry 1133 and the indoor unit communication circuitry 1233. That is, the distributor communication circuitry 1333 may exchange information with the outdoor unit communication circuitry 1133 and the indoor unit communication circuitry 1233 through wired/wireless communication.

The wireless communication may use at least one of 5th generation (5G) mobile telecommunication, long-term evolution (LTE), LTE Advance (LTE-A), code division multiple access (CDMA), wideband CDMA (WCDMA), universal mobile telecommunications system (UMTS), Wireless Broadband (WiBro), or Global System for Mobile Communications (GSM), which are cellular communication protocol. In addition, the wireless communication may include local communication. The local communication may include at least one of wireless fidelity (WiFi), Bluetooth, or near field communication (NFC).

The wired communication may include at least one of universal serial bus (USB), high definition multimedia interface (HDMI), a recommended standard 232 (RS-232), or plain old telephone service (POTS).

For example, the distributor communication circuitry 1333 may receive an open request signal about the cooling valve 1310 and the heating valve 1320 from the outdoor unit communication circuitry 1133 and the indoor unit communication circuitry 1233

According to an embodiment, the distributor controller 1331 drives the cooling valve 1310 and the heating valve 1320 according to the operation mode of the indoor unit 1200. More particularly, the distributor controller 1331 may generate a drive current and provide the drive current to the cooling valve 1310 and the heating valve 1320 to open and close the cooling valve 1310 and the heating valve 1320.

For example, when the open request for the third cooling valve 1310-3 (refer to FIG. 12) is received from the outdoor communication circuitry 1133 or the third indoor communication circuitry 1233-3 through the distributor communication circuitry 1333, the distributor controller 1331 controls the third cooling valve 1310-3 to open the third cooling valve 1310-3 (refer to FIG. 12)

By controlling the cooling valve 1310-1, 1310-2, 1310-3, ..., 1310-n and the heating valve 1320-1, 1320-2, 1320-3, ..., 1320-n of the distributor 1300, the distributor controller 1331 may switch the direction of the refrigerant flowing in each of the indoor unit 1200-1, 1200-2, 1200-3, ..., 1200-n, for the cooling mode or the heating mode according to the operation mode of each of the indoor unit 1200-1, 1200-2, 1200-3, ..., 1200-n.

Accordingly, the multi air conditioner system 10 including the plurality of indoor units 1200 may set the duration corresponding to the measured outdoor temperature, and may change the operation mode of each of the indoor units 1200-1, 1200-2, 1200-3, ..., 1200-n according to the indoor temperature of the indoor space in which the each of the indoor units 1200-1, 1200-2, 1200-3, ..., 1200-n is placed.

When the indoor temperature measured by the each of the indoor units 1200-1, 1200-2, 1200-3, ..., 1200-n is maintained at the first reference indoor temperature or greater which is set to the reference temperature for a change to cooling mode, for the determined duration, the multi air conditioner system 10 may change the operation mode from the heating mode to the cooling mode.

Further, when the indoor temperature measured by the each of the indoor units 1200-1, 1200-2, 1200-3, ..., 1200-n is maintained at the second reference indoor temperature or less which is set to the reference temperature for a change to heating mode, for the determined duration, the multi air conditioner system 10 may change the operation mode from the cooling mode to the heating mode.

Hereinafter a control method of the air conditioner 1 and the multi air conditioner system 10 according to an embodiment will be described. The air conditioner 1 and the multi air conditioner system 10 according to the above-described embodiments may be applied to the control method of the air conditioner 1 and the multi air conditioner system 10 described later. Therefore, the description that has been described with reference to FIGS. 1 to 15 may be equally applicable to the control method of the air conditioner 1 and the multi air conditioner system 10 unless otherwise noted.

Figure 16:
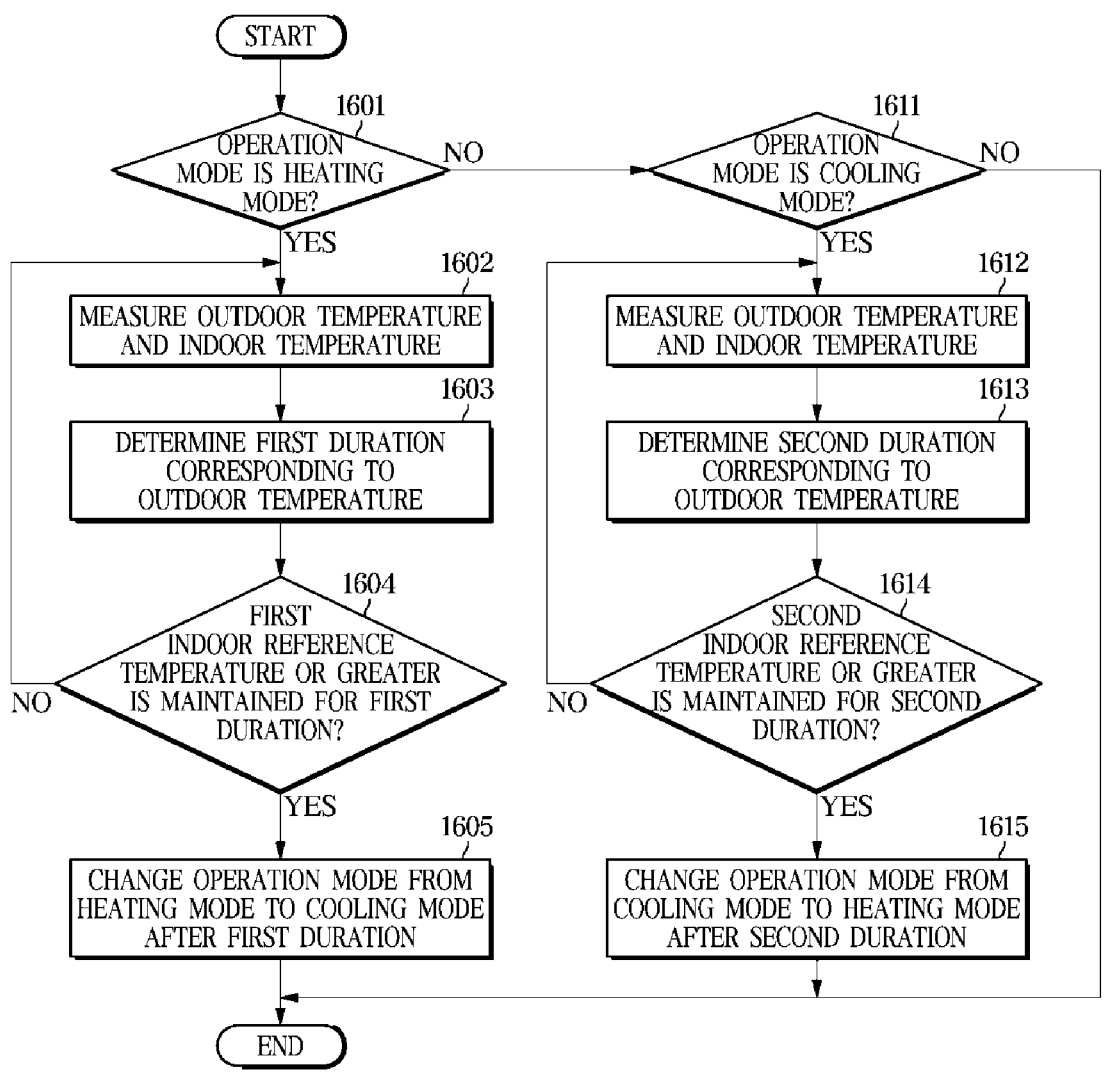
FIG. 16 is a flow chart of a control method of an air conditioner according to an embodiment of the disclosure, particularly a case in which a mode change is performed based on an outdoor temperature and an indoor temperature.

FIG. 16 is a flow chart of a control method of an air conditioner 1 according to an embodiment of the disclosure, particularly a case in which a mode change is performed based on an outdoor temperature and an indoor temperature Referring to FIG. 16, according to an embodiment, when the operation mode of the air conditioner 1 is the heating mode (yes in 1601), the air conditioner 1 may measure the outdoor temperature and the indoor temperature (1602).

Particularly, the air conditioner 1 may measure the outdoor temperature through the outdoor temperature measurer 134 contained in the outdoor unit 100, and may measure the indoor temperature through the indoor temperature measurer 234 contained in the indoor unit 200.

According to an embodiment, the air conditioner 1 may determine the duration corresponding to the outdoor temperature (1603).

In this case, the duration means a period of time that is required to be maintained at the reference temperature of the mode change, for the mode change. That is, when the indoor temperature is maintained at the reference temperature or greater for the duration, the mode of the air conditioner 1 may be changed.

Based on the first duration information 700 and the set number, the air conditioner 1 may determine the first duration to be shorter than the predetermined basic duration when the measured outdoor temperature is equal to or greater than the first reference outdoor temperature that is set to the reference temperature to reduce the duration for a change to the cooling mode, and the air conditioner 1 may determine the predetermined basic duration as the first duration when the measured outdoor temperature is less than the first reference outdoor temperature.

Further, the air conditioner 1 may set the first outdoor lower limit temperature 910 and the first outdoor upper limit temperature 920 as the reference temperature to reduce the duration for a change to the cooling mode, based on the third duration information 900, and determine the first duration to allow a period of time, which is reduced from the predetermined basic duration, to increase as the measured outdoor temperature increases from the first outdoor lower limit temperature 910 to the first outdoor upper limit temperature 920.

According to an embodiment, when the indoor temperature is maintained at the first reference indoor temperature or greater for the first duration (yes in 1604), the air conditioner 1 may change the operation mode from the heating mode to the cooling mode after the first duration (1605).

The first reference indoor temperature is a reference temperature that is set for a change to the cooling mode, and when the measured indoor temperature is maintained at the first reference indoor temperature or greater for the determined first duration, the air conditioner 1 may change the operation mode from the heating mode to the cooling mode after the first duration.

Accordingly, the air conditioner 1 determines the duration that is shorter than the predetermined basic duration in a state in which the heat is transferred from the outside to the indoor space due to the increase of the outdoor temperature and the load on the mode change is increased, and thus the air conditioner 1 may quickly change the operation mode to the cooling mode.

That is, the air conditioner 1 may respond to the load on the mode change in advance by determining the duration, which is required to be maintained at the reference temperature of the mode change for the mode change, based on the outdoor temperature, and thus it is possible to maintain the indoor temperature at the set temperature although the outdoor temperature rapidly changes.

When the operation mode of the air conditioner 1 is not the heating mode (no in 1601) and when the operation mode of the air conditioner 1 is the cooling mode (yes in 1611), the air conditioner 1 according to an embodiment may measure the outdoor temperature and the indoor temperature (1612).

Particularly, the air conditioner 1 may measure the outdoor temperature through the outdoor temperature measurer 134 contained in the outdoor unit 100, and may measure the indoor temperature through the indoor temperature measurer 234 contained in the indoor unit 200.

According to an embodiment, the air conditioner 1 may determine the duration corresponding to the outdoor temperature (1613).

Based on the second duration information 800 and the set number, the air conditioner 1 may determine the second duration to be shorter than the predetermined basic duration when the measured outdoor temperature is equal to or less than the second reference outdoor temperature that is set to the reference temperature to reduce the duration for a change to the heating mode, and the indoor unit controller 1231 may determine the predetermined basic duration as the second duration when the measured outdoor temperature exceeds the second reference outdoor temperature.

Further, the air conditioner 1 may set the second outdoor lower limit temperature 1010 and the second outdoor upper limit temperature 1020 as the reference temperature to reduce the duration for a change to the heating mode, based on the fourth duration information 1000, and determine the second duration to allow a period of time, which is reduced from the predetermined basic duration, to increase as the measured outdoor temperature decreases from the second outdoor upper limit temperature 1020 to the second outdoor lower limit temperature 1010.

According to an embodiment, when the indoor temperature is maintained at the second reference indoor temperature or less for the second duration (yes in 1614), the air conditioner 1 may change the operation mode from the cooling mode to the heating mode after the second duration (1615).

The second reference indoor temperature is a reference temperature that is set for a change to the heating mode, and when the measured indoor temperature is maintained at the second reference indoor temperature or less, for the determined second duration, the air conditioner 1 may change the operation mode from the heating mode to the cooling mode after the second duration.

It is possible to change the operation mode of the air conditioner 1 from the cooling mode to the heating mode.

Accordingly, the air conditioner 1 determines the duration that is shorter than the predetermined basic duration in a state in which the heat is transferred from the indoor space to the outdoor space due to the decrease of the outdoor temperature and the load on the mode change is increased, and thus the air conditioner 1 may quickly change the operation mode to the heating mode.

That is, the air conditioner 1 may respond to the load on the mode change in advance by determining the duration, which is required to be maintained at the reference temperature of the mode change for the mode change, based on the outdoor temperature, and thus it is possible to maintain the indoor temperature at the set temperature although the outdoor temperature rapidly changes.

The operation of the outdoor unit controller 1131 and the indoor unit controller 1231 of the multi air conditioner system 10 may be the same as the operation of the air conditioner 1 described with reference to FIG. 16.

However, by controlling the cooling valve 1310-1, 1310-2, 1310-3, ..., 1310-n and the heating valve 1320-1, 1320-2, 1320-3, ..., 1320-n of the distributor 1300 according to the operation mode of each of the indoor unit 1200-1, 1200-2, 1200-3, ..., 1200-n, the outdoor unit controller 1131 and the indoor unit controller 1231 of the multi air conditioner system 10 may switch the direction of the refrigerant flowing in each of the indoor unit 1200-1, 1200-2, 1200-3, ..., 1200-n, for the cooling mode or the heating mode.

Particularly, upon changing the operation mode of each of the indoor unit 1200-1, 1200-2, 1200-3, ..., 1200-n, from the heating mode to the cooling mode, the outdoor unit controller 1131 and the indoor unit controller 1231 of the multi air conditioner system 10 may control the outdoor unit communication circuitry 1133 and the indoor unit communication circuitry 1233 to transmit the signal for requesting to open the cooling valve 1310 to the distributor 1300 for the cooling mode of the indoor unit 1200. Accordingly, the distributor 1300 may open the cooling valve 1310 to allow the indoor units 1200-1, 1200-2, 1200-3, ..., and 1200-n to operate in the cooling mode.

Further, upon changing the operation mode of each of the indoor unit 1200-1, 1200-2, 1200-3, ..., 1200-n, from the cooling mode to the heating mode, the outdoor unit controller 1131 and the indoor unit controller 1231 of the multi air conditioner system 10 may control the outdoor unit communication circuitry 1133 and the indoor unit communication circuitry 1233 to transmit the signal for requesting to open the heating valve 1320 to the distributor 1300 for the heating mode of the indoor unit 1200. Accordingly, the distributor 1300 may open the heating valve 1320 to allow the indoor units 1200-1, 1200-2, 1200-3, ..., and 1200-n to operate in the heating mode.

As is apparent from the above description, it is possible to determine duration, which is required to be maintained at a reference temperature of the mode change for the mode change, based on an outdoor temperature.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner comprising:
a compressor configured to compress a refrigerant;
an outdoor heat exchanger configured to perform a heat exchange between outdoor air and the refrigerant;
an indoor heat exchanger configured to perform a heat exchange between indoor air and the refrigerant;
a four-way valve configured to guide the refrigerant compressed in the compressor to either the outdoor heat exchanger or the indoor heat exchanger according to whether the air conditioner is to operate in a cooling mode or a heating mode;
an outdoor temperature measurer configured to measure an outdoor temperature;
an indoor temperature measurer configured to measure an indoor temperature; and
a controller configured to:
determine a first duration of time based on the measured outdoor temperature when the air conditioner is operating in the heating mode or determine a second duration of time based on the measured outdoor temperature when the air conditioner is operating in the cooling mode,
change the heating mode to the cooling mode in response to the measured indoor temperature being maintained at a first reference indoor temperature or greater for a time equal to or greater than the determined first duration of time, and
change the cooling mode to the heating mode in response to the measured indoor temperature being maintained at a second reference indoor temperature or less for a time equal to or greater than the determined second duration of time.

2. The air conditioner of claim 1, wherein
the first duration of time is determined to correspond to a predetermined basic duration of time when the measured outdoor temperature is less than a first reference outdoor temperature, and the first duration of time is determined to correspond to a duration of time less than the predetermined basic duration of time when the measured outdoor temperature is equal to or greater than the first reference outdoor temperature.

3. The air conditioner of claim 1, wherein
the controller is configured to set a first outdoor lower limit temperature and a first outdoor upper limit temperature,
the first duration of time is determined to correspond to a predetermined basic duration of time, when the measured outdoor temperature is equal to or less than the first outdoor lower limit temperature,
the first duration of time is determined to correspond to a minimum duration of time which is less than the predetermined basic duration of time when the measured outdoor temperature is equal to or greater than the first outdoor upper limit temperature, and
the first duration of time is determined to correspond to a duration of time which is less than the predetermined basic duration of time and greater than the minimum duration of time, when the measured outdoor temperature is between the first outdoor lower limit temperature and the first outdoor upper limit temperature.

4. The air conditioner of claim 1, wherein
in a state in which the air conditioner performs a heating operation according to the heating mode, in response to the measured indoor temperature being maintained at the first reference indoor temperature or greater for the time equal to or greater than the determined first duration of time, the controller is configured to change the air conditioner from the heating mode to the cooling mode after the determined first duration of time.

5. The air conditioner of claim 1, wherein
the second duration of time is determined to correspond to a predetermined basic duration of time when the measured outdoor temperature is greater than a second reference outdoor temperature, and
the second duration of time is determined to correspond a duration of time less than the predetermined basic duration of time when the measured outdoor temperature is equal to or less than the second reference outdoor temperature.

6. The air conditioner of claim 1, wherein
the controller is configured to set a second outdoor lower limit temperature and a second outdoor upper limit temperature,
the second duration of time is determined to correspond to a predetermined basic duration of time, when the measured outdoor temperature is equal to or greater than the second outdoor upper limit temperature,
the second duration of time is determined to correspond to a minimum duration of time which is less than the predetermined basic duration of time when the measured outdoor temperature is equal to or less than the second outdoor lower limit temperature, and
the second duration of time is determined to correspond to a duration of time which is less than the predetermined basic duration of time and greater than the minimum duration of time, when the measured outdoor temperature is between the second outdoor lower limit temperature and the second outdoor upper limit temperature.

7. The air conditioner of claim 1, wherein
in a state in which the air conditioner performs a cooling operation according to the cooling mode, in response to the measured indoor temperature being maintained at the second reference indoor temperature or less for the time equal to or greater than the determined second duration, the controller is configured to change the air conditioner from the cooling mode to the heating mode after the determined second duration of time.

8. The air conditioner of claim 1, further comprising:
an inputter configured to receive an input from a user, wherein
based on the input received from the user, the controller is configured to set a first reference outdoor temperature by which the first duration of time is determined for changing the heating mode to the cooling mode, and
the controller is configured to set a second reference outdoor temperature by which the second duration of time is determined for changing the cooling mode to the heating mode.

9. The air conditioner of claim 8, wherein
the inputter is configured to receive an input including a set temperature of the indoor temperature, a first critical temperature, and a second critical temperature, from the user, and
based on the input received from the user, the controller is configured to set the first reference indoor temperature to be greater than the set temperature by the first critical temperature, and to set the second reference indoor temperature to be less than the set temperature by the second critical temperature.

10. The air conditioner of claim 8, wherein
the inputter is configured to receive a set heating temperature of the indoor temperature, a set cooling temperature of the indoor temperature, a third critical temperature, and a fourth critical temperature, from the user, and
based on the input received from the user, the controller is configured to set the first reference indoor temperature to be greater than the set heating temperature by the third critical temperature, and to set the second reference indoor temperature to be less than the set cooling temperature by the fourth critical temperature.

11. A control method of an air conditioner comprising a compressor configured to compress a refrigerant, an outdoor heat exchanger configured to perform a heat exchange between outdoor air and the refrigerant, an indoor heat exchanger configured to perform a heat exchange between indoor air and the refrigerant, and a four-way valve configured to guide the compressed refrigerant to either the outdoor heat exchanger or the indoor heat exchanger according to a mode of operation of the air conditioner, the control method comprising:
measuring an indoor temperature and an outdoor temperature;
determining a first duration of time based on the measured outdoor temperature when the air conditioner is operating in a heating mode or determining a second duration of time based on the measured outdoor temperature when the air conditioner is operating in a cooling mode;
changing the heating mode to the cooling mode in response to the measured indoor temperature being maintained at a first reference indoor temperature or greater for a time equal to or greater than the determined first duration of time; and
changing the cooling mode to the heating mode in response to the measured indoor temperature being maintained at a second reference indoor temperature or less for a time equal to or greater than the determined second duration of time.

12. The control method of claim 11, wherein the determining of the first duration of time comprises:
  determining the first duration of time to correspond to a predetermined basic duration of time when the measured outdoor temperature is less than a first reference outdoor temperature; and
  determining the first duration of time to correspond to a duration of time less than the predetermined basic duration of time when the measured outdoor temperature is equal to or greater than the first reference outdoor temperature.

13. The control method of claim 11, wherein the determining of the first duration of time comprises:
  setting a first outdoor lower limit temperature and a first outdoor upper limit temperature;
  determining the first duration of time to correspond to a predetermined basic duration of time, when the measured outdoor temperature is equal to or less than the first outdoor lower limit temperature;
  determining the first duration of time to correspond to a minimum duration of time which is less than the predetermined basic duration of time when the measured outdoor temperature is equal to or greater than the first outdoor upper limit temperature; and
  determining the first duration of time to correspond to a duration of time which is less than the predetermined basic duration of time and greater than the minimum duration of time, when the measured outdoor temperature is between the first outdoor lower limit temperature and the first outdoor upper limit temperature.

14. The control method of claim 11, wherein
  the changing the heating mode to the cooling mode comprises, in a state in which the air conditioner performs a heating operation according to the heating mode, in response to the measured indoor temperature being maintained at the first reference indoor temperature or greater for the time equal to or greater than the determined first duration of time, changing the air conditioner from the heating mode to the cooling mode after the determined first duration of time.

15. The control method of claim 11, wherein the determining of the second duration of time comprises:
  determining the second duration of time to correspond to a predetermined basic duration of time when the measured outdoor temperature is greater than a second reference outdoor temperature; and
  determining the second duration of time to correspond to a duration of time less than the predetermined basic duration of time when the measured outdoor temperature is equal to or less than the second reference outdoor temperature.

16. The control method of claim 11, wherein the determining of the second duration of time comprises:
  setting a second outdoor lower limit temperature and a second outdoor upper limit;
  determining the second duration of time to correspond to a predetermined basic duration of time, when the measured outdoor temperature is equal to or greater than the second outdoor upper limit temperature;
  determining the second duration of time to correspond to a minimum duration of time which is less than the predetermined basic duration of time when the measured outdoor temperature is equal to or less than the second outdoor lower limit temperature; and
  determining the second duration of time to correspond to a duration of time which is less than the predetermined basic duration of time and greater than the minimum duration of time, when the measured outdoor temperature is between the second outdoor lower limit temperature and the second outdoor upper limit temperature.

17. The control method of claim 11, wherein
  the changing of the cooling mode to the heating mode comprises, in a state in which the air conditioner performs a cooling operation according to the cooling mode, in response to the measured indoor temperature being maintained at the second reference indoor temperature or less for the time equal to or greater than the determined second duration of time, changing the air conditioner from the cooling mode to the heating mode after the determined second duration of time.

18. The control method of claim 11, further comprising:
  receiving an input from a user,
  based on the input received from the user, setting a first reference outdoor temperature by which the first duration of time is determined for changing the heating mode to the cooling mode; and
  setting a second reference outdoor temperature by which the second duration of time is determined for changing the cooling mode to the heating mode.

19. The control method of claim 18, further comprising:
  receiving an input including a set temperature of the indoor temperature, a first critical temperature, and a second critical temperature from a user;
  based on the input received from the user, setting the first reference indoor temperature to be greater than the set temperature by the first critical temperature; and
  setting the second reference indoor temperature to be less than the set temperature by the second critical temperature.

20. An air conditioner comprising:
  at least one outdoor unit configured to perform a heat exchange between outdoor air and a refrigerant and configured to measure an outdoor temperature;
  a plurality of indoor units configured to perform a heat exchange between indoor air and the refrigerant and configured to measure an indoor temperature of an indoor space in which the plurality of indoor units are placed;
  a distributor configured to distribute the refrigerant supplied from the at least one outdoor unit to each of the plurality of indoor units according to a mode of operation of each of the plurality of indoor units; and
  a controller configured to:
    determine a first duration of time based on the measured outdoor temperature which is used for changing a mode of operation of at least one indoor unit among the plurality of indoor units to a cooling mode or determine a second duration of time based on the measured outdoor temperature which is used for changing a mode of operation of at least one indoor unit among the plurality of indoor units to a heating mode,
    change a mode of operation of at least one indoor unit among the plurality of indoor units to the cooling mode when an in response to the measured indoor temperature being maintained at a first reference indoor temperature or greater for a time equal to or greater than the determined first duration of time, and
    change a mode of operation of at least one indoor unit among the plurality of indoor units to the heating mode in response to the measured indoor temperature being maintained at a second reference indoor temperature or less for a time equal to or greater than the determined second duration of time.

* * * * *